(12) United States Patent
Papasakellariou et al.

(10) Patent No.: US 11,057,921 B2
(45) Date of Patent: Jul. 6, 2021

(54) SYSTEM AND METHOD FOR IMPROVING SPECTRAL EFFICIENCY AND COVERAGE FOR USER EQUIPMENTS

(71) Applicant: Samsung Electronics Co., Ltd., Suwon-si (KR)

(72) Inventors: Aris Papasakellariou, Houston, TX (US); Boon Loong Ng, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1354 days.

(21) Appl. No.: 14/868,189

(22) Filed: Sep. 28, 2015

(65) Prior Publication Data

US 2016/0100422 A1  Apr. 7, 2016

Related U.S. Application Data

(60) Provisional application No. 62/058,433, filed on Oct. 1, 2014, provisional application No. 62/074,540, filed (Continued)

(51) Int. Cl.
| | |
|---|---|
| *H04W 74/08* | (2009.01) |
| *H04W 72/12* | (2009.01) |
| *H04L 1/18* | (2006.01) |
| *H04L 1/00* | (2006.01) |
| *H04W 28/06* | (2009.01) |

(Continued)

(52) U.S. Cl.
CPC ........ *H04W 72/1289* (2013.01); *H04L 1/0072* (2013.01); *H04L 1/1861* (2013.01); *H04L 1/1896* (2013.01); *H04L 1/22* (2013.01); *H04W 28/06* (2013.01); *H04W 74/08* (2013.01); *H04L 1/0061* (2013.01); *H04W 74/006* (2013.01)

(58) Field of Classification Search
CPC ............. H04W 72/1289; H04W 74/08; H04W 74/006; H04W 28/06; H04L 1/1896; H04L 1/0072; H04L 1/1861; H04L 1/22; H04L 1/0061
See application file for complete search history.

(56) References Cited

U.S. PATENT DOCUMENTS

| | | | |
|---|---|---|---|
| 2008/0232283 A1 | 9/2008 | Jen | |
| 2010/0040001 A1* | 2/2010 | Montojo | H04W 74/006 370/329 |

(Continued)

OTHER PUBLICATIONS

International Search Report and Written Opinion issued for PCT/KR2015/010389 dated Feb. 23, 2016, 11 pgs.

(Continued)

*Primary Examiner* — Brian P Cox

(57) ABSTRACT

Methods and apparatus are provided to improve spectral efficiency, coverage, and data rates for communication between a base station and user equipments (UEs). In a first case, mechanisms to reduce a size of a random access response message are provided. In a second case, mechanisms to support UE-group scheduling are provided. In a third case, control signaling designs according to a coverage requirement for a UE are provided. In a fourth case, designs for allocation of downlink (DL) subframes and uplink (UL) subframes in order to adjust a data rate and minimize switching between DL and UL for a half-duplex FDD UE are provided.

13 Claims, 10 Drawing Sheets

Related U.S. Application Data on Nov. 3, 2014, provisional application No. 62/201,182, filed on Aug. 5, 2015.

(51) Int. Cl.
*H04L 1/22* (2006.01)
*H04W 74/00* (2009.01)

(56) References Cited

U.S. PATENT DOCUMENTS

| | | | |
|---|---|---|---|
| 2010/0093386 A1 | 4/2010 | Damnjanovic et al. | |
| 2010/0275086 A1 | 10/2010 | Bergquist et al. | |
| 2012/0044897 A1* | 2/2012 | Wager | H04L 5/0037 |
| | | | 370/329 |
| 2012/0147830 A1* | 6/2012 | Lohr | H04L 1/1854 |
| | | | 370/329 |
| 2012/0236803 A1* | 9/2012 | Vujcic | H04L 5/003 |
| | | | 370/329 |
| 2012/0269140 A1 | 10/2012 | Nam et al. | |
| 2012/0327783 A1 | 12/2012 | Moon et al. | |
| 2013/0034059 A1* | 2/2013 | Lee | H04W 74/006 |
| | | | 370/328 |
| 2013/0083749 A1 | 4/2013 | Xu et al. | |
| 2014/0119269 A1* | 5/2014 | Guan | H04L 1/0006 |
| | | | 370/312 |
| 2014/0185595 A1 | 7/2014 | Wu et al. | |
| 2014/0204827 A1* | 7/2014 | Grandhi | H04W 74/0816 |
| | | | 370/312 |
| 2014/0341163 A1* | 11/2014 | Zhang | H04B 7/024 |
| | | | 370/329 |
| 2015/0049712 A1* | 2/2015 | Chen | H04W 72/04 |
| | | | 370/329 |
| 2015/0063231 A1* | 3/2015 | Seo | H04W 72/042 |
| | | | 370/329 |
| 2016/0100382 A1* | 4/2016 | He | H04L 5/0094 |
| | | | 370/329 |
| 2017/0280481 A1* | 9/2017 | Stern-Berkowitz | |
| | | | H04L 1/1854 |

OTHER PUBLICATIONS

Extended European Search Report for European Application No. 15846148.3, dated Sep. 6, 2017 (11 pages).

"Signaling and Design of UE-Common Control Messages", 3GPP TSG RAN WG1 #79 San Francisco, USA, Nov. 17-21, 2014 (3 pages).

European Patent Office, Communication pursuant to Article 94(3) EPC, dated Mar. 1, 2021 regarding Application No. 15846148.3, 6 pages.

* cited by examiner

SYSTEM AND METHOD FOR IMPROVING SPECTRAL EFFICIENCY AND COVERAGE FOR USER EQUIPMENTS

CROSS-REFERENCE TO RELATED APPLICATION AND CLAIM OF PRIORITY

The present application claims priority under 35 U.S.C. § 119(e) to: U.S. Provisional Patent Application Ser. No. 62/058,433 filed Oct. 1, 2014, entitled "HALF-DUPLEX FDD OPERATION FOR USER EQUIPMENTS WITH A SINGLE OSCILLATOR;" U.S. Provisional Patent Application Ser. No. 62/074,540 filed Nov. 3, 2014, entitled "ENHANCING RELIABILITY OF COMMON CONTROL SIGNALING FOR LOW COST USER EQUIPMENTS;" and U.S. Provisional Patent Application Ser. No. 62/201,182 filed Aug. 5, 2015, entitled "ENHANCING RELIABILITY OF COMMON CONTROL SIGNALING FOR LOW COST USER EQUIPMENTS." The contents of the above-identified patent documents are incorporated herein by reference. The contents of the above-identified patent document are incorporated herein by reference.

TECHNICAL FIELD

The present application relates generally to wireless communications and, more specifically, to improving spectral efficiency and coverage for communication with low cost user equipments.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

This disclosure provides methods and apparatus to improve spectral efficiency and coverage for communication of a base station with user equipments.

In a first embodiment, a base station includes a controller and a transmitter. The controller is configured to generate a first random access response (RAR) message or a second RAR message. The transmitter configured to transmit the first RAR message or the second RAR message. A size of an information element (IE) in the second RAR message is smaller than a size of the IE in the first RAR message.

In a second embodiment, a base station includes an encoder and a transmitter. The encoder is configured to encode a first downlink control information (DCI) format or a second DCI format. The transmitter configured to transmit information configuring a user equipment (UE) to receive either the first DCI format or the second DCI format and to transmit the first DCI format or the second DCI format. Both the first DCI format and the second DCI format schedule either data transmission to the UE or data transmission from the UE and correspond to a same data transmission mode. A size of an information element (IE) in the second DCI format is smaller than a size of the IE in the first DCI format.

In a third embodiment, a user equipment includes a receiver and a decoder. The receiver configured to receive information configuring reception of either a first downlink control information (DCI) format or a second DCI format and to receive the first DCI format or the second DCI format. Both the first DCI format and the second DCI format schedule either data transmission to the user equipment or data transmission from the user equipment and correspond to a same data transmission mode. A size of an information element (IE) in the second DCI format is smaller than a size of the IE in the first DCI format. The decoder is configured to decode the first DCI format or the second DCI format.

In a fourth embodiment, a method includes transmitting, by a base station, a first random access response (RAR) message to a user equipment (UE) of a first type in response to a detection of a first random access (RA) preamble from the UE of the first type. The method additionally includes transmitting, by the base station, a second RAR message to a UE of a second type in response to a detection of a second RA preamble from the UE of the second type wherein a size of an information element (IE) in the second RAR message is smaller than a size of the IE in the first RAR message.

In a fifth embodiment, a method includes transmitting, by a base station to a user equipment (UE), information configuring the UE to receive a first downlink control information (DCI) format or a second DCI format. The method additionally includes transmitting, by the base station, either the first DCI format or the second DCI format. Both the first DCI format and the second DCI format schedule either data transmission to the UE or data transmission from the UE and correspond to a same data transmission mode. A size of an information element (IE) in the second DCI format is smaller than a size of the IE in the first DCI format.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many if not most instances such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged wireless communication system.

The following documents and standards descriptions are hereby incorporated into the present disclosure as if fully set forth herein: 3GPP TS 36.211 v12.2.0, "E-UTRA, Physical channels and modulation" (REF 1); 3GPP TS 36.212 v12.2.0, "E-UTRA, Multiplexing and Channel coding" (REF 2); 3GPP TS 36.213 v12.2.0, "E-UTRA, Physical Layer Procedures" (REF 3); 3GPP TS 36.321 v12.2.0, "E-UTRA, Medium Access Control (MAC) protocol specification" (REF 4); and 3GPP TS 36.331 v12.2.0, "E-UTRA, Radio Resource Control (RRC) Protocol Specification" (REF 5).

This disclosure relates to resource mapping for coverage enhancements of broadcast signaling. A wireless communication network includes a DownLink (DL) that conveys signals from transmission points, such as base stations or enhanced ENBs (eNBs), to UEs. The wireless communication network also includes an UpLink (UL) that conveys signals from UEs to reception points, such as eNBs.

Figure 1:
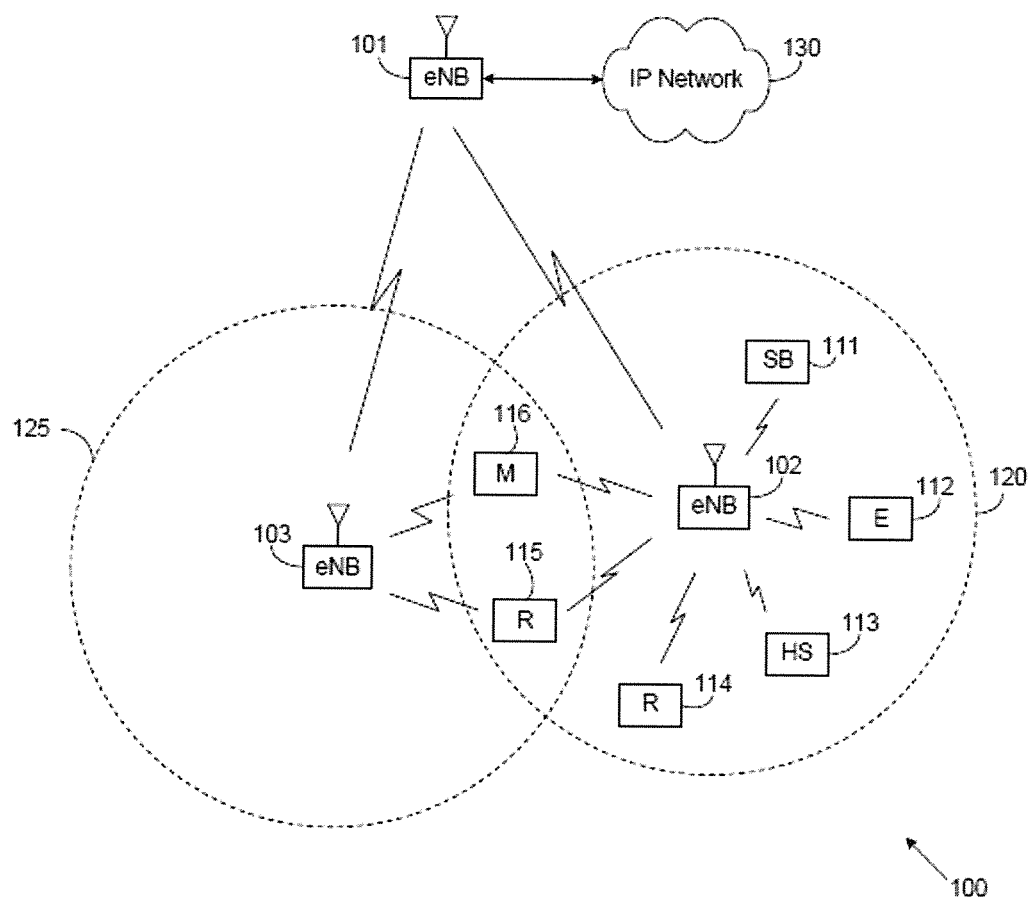
FIG. 1 illustrates an example wireless communication network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms can be used instead of "eENB" or "eNB," such as "base station" or "access point." For the sake of convenience, the terms "eENB" and "eNB" are used in this patent document to refer to network infrastructure components that provide wireless access to remote terminals. Also, depending on the network type, other well-known terms can be used instead of "user equipment" or "UE," such as "mobile station," "subscriber station," "remote terminal," "wireless terminal," or "user device." A UE, can be fixed or mobile and can be a cellular phone, a personal computer device, and the like. For the sake of convenience, the terms "user equipment" and "UE" are used in this patent document to refer to remote wireless equipment that wirelessly accesses an eNB, whether the UE is a mobile device (such as a mobile telephone or smart-phone) or is normally considered a stationary device (such as a desktop computer or vending machine).

The eNB 102 provides wireless broadband access to the network 130 for a first plurality of UEs within a coverage area 120 of the eNB 102. The first plurality of UEs includes a UE 111, which can be located in a small business (SB); a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, can have other shapes, including irregular shapes, depending upon the configuration of the eNBs and variations in the radio environment associated with natural and man-made obstructions.

As described in more detail below, various components of the network 100 (such as the eNBs 101-103 and/or the UEs 111-116) support the adaptation of communication direction in the network 100. In addition, various components of the network 100 (such as the eNBs 101-103 and/or the UEs 111-116) can provide coverage enhancement for broadcast signaling.

Although FIG. 1 illustrates one example of a wireless network 100, various changes can be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2:
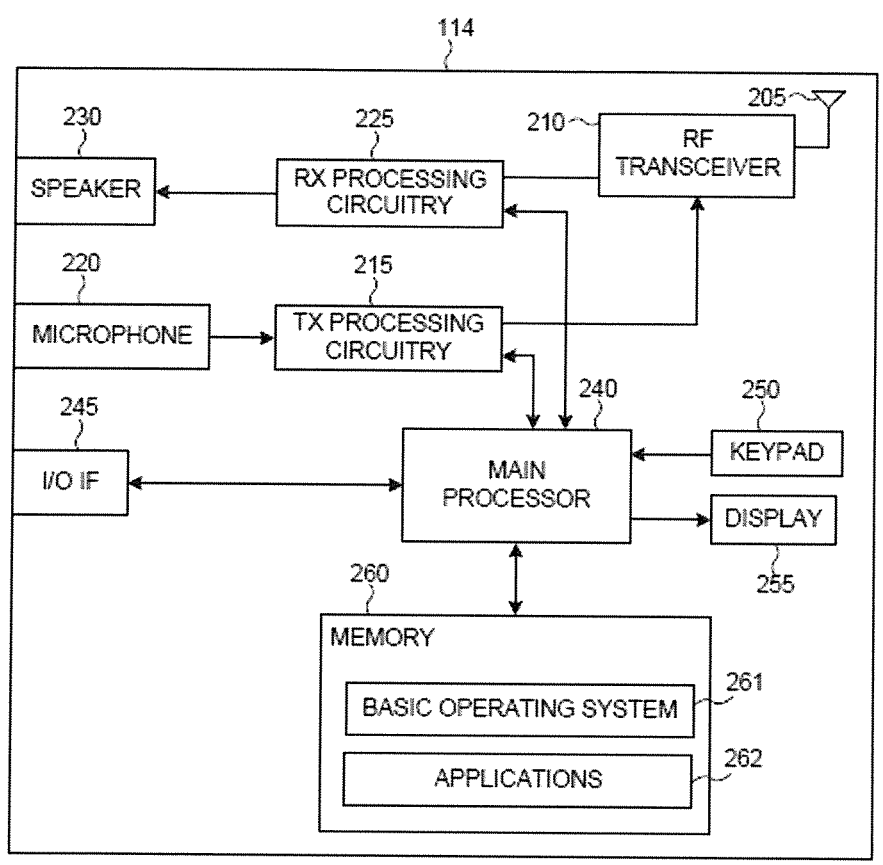
FIG. 2 illustrates an example user equipment (UE) according to this disclosure.

FIG. 2 illustrates an example UE 114 according to this disclosure. The embodiment of the UE 114 shown in FIG. 2 is for illustration only, and the other UEs in FIG. 1 could have the same or similar configuration. However, UEs come in a wide variety of configurations, and FIG. 2 does not limit the scope of this disclosure to any particular implementation of a UE.

As shown in FIG. 2, the UE 114 includes an antenna 205, a radio frequency (RF) transceiver 210, transmit (TX) processing circuitry 215, a microphone 220, and receive (RX) processing circuitry 225. The UE 114 also includes a speaker 230, a main processor 240, an input/output (I/O) interface (IF) 245, a keypad 250, a display 255, and a memory 260. The memory 260 includes a basic operating system (OS) program 261 and one or more applications 262.

The RF transceiver 210 receives, from the antenna 205, an incoming RF signal transmitted by an eNB or another UE. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the main processor 240 for further processing (such as for web browsing data).

The TX processing circuitry 215 receives analog or digital voice data from the microphone 220 or other outgoing baseband data (such as web data, e-mail, or interactive video game data) from the main processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The main processor 240 can include one or more processors or other processing devices and can execute the basic OS program 261 stored in the memory 260 in order to control the overall operation of the UE 114. For example, the main processor 240 could control the reception of forward channel signals and the transmission of reverse channel signals by the RF transceiver 210, the RX processing circuitry 225, and the TX processing circuitry 215 in accordance with well-known principles. In some embodiments, the main processor 240 includes at least one microprocessor or microcontroller.

The main processor 240 is also capable of executing other processes and programs resident in the memory 260. The main processor 240 can move data into or out of the memory 260 as required by an executing process. In some embodiments, the main processor 240 is configured to execute the applications 262 based on the OS program 261 or in response to signals received from eNBs, other UEs, or an operator. The main processor 240 is also coupled to the I/O interface 245, which provides the UE 114 with the ability to connect to other devices such as laptop computers and handheld computers. The I/O interface 245 is the communication path between these accessories and the main processor 240.

The main processor 240 is also coupled to the keypad 250 and the display unit 255. The operator of the UE 114 can use the keypad 250 to enter data into the UE 114. The display 255 can be a liquid crystal display or other display capable of rendering text and/or at least limited graphics, such as from web sites. The display 255 could also represent a touch-screen.

The memory 260 is coupled to the main processor 240. Part of the memory 260 could include a broadcast signaling memory (RAM), and another part of the memory 260 could include a Flash memory or other read-only memory (ROM).

In certain embodiments, the UE 114 includes a decoder configured to decode a first DCI format or a second DCI format. The decoder can be implemented by separate processing circuitry configured to perform the decoding operation. In certain embodiments, the decoder operations are performed by the main processor 240 based on instructions stored in memory 260.

As described in more detail below, the transmit and receive paths of the UE 114 (implemented using the RF transceiver 210, TX processing circuitry 215, and/or RX processing circuitry 225) support broadcast signaling in a normal mode or in an enhanced coverage mode. In addition, the main processor 240 is configured to support broadcast signaling in a normal mode or in an enhanced coverage mode.

Although FIG. 2 illustrates one example of UE 114, various changes can be made to FIG. 2. For example, various components in FIG. 2 could be combined, further subdivided, or omitted and additional components could be added according to particular needs. As a particular example, the main processor 240 could be divided into multiple processors, such as one or more central processing units (CPUs) and one or more graphics processing units (GPUs). Also, while FIG. 2 illustrates the UE 114 configured as a mobile telephone or smart-phone, UEs could be configured to operate as other types of mobile or stationary devices. In addition, various components in FIG. 2 could be replicated, such as when different RF components are used to communicate with the eNBs 101-103 and with other UEs.

Figure 3:
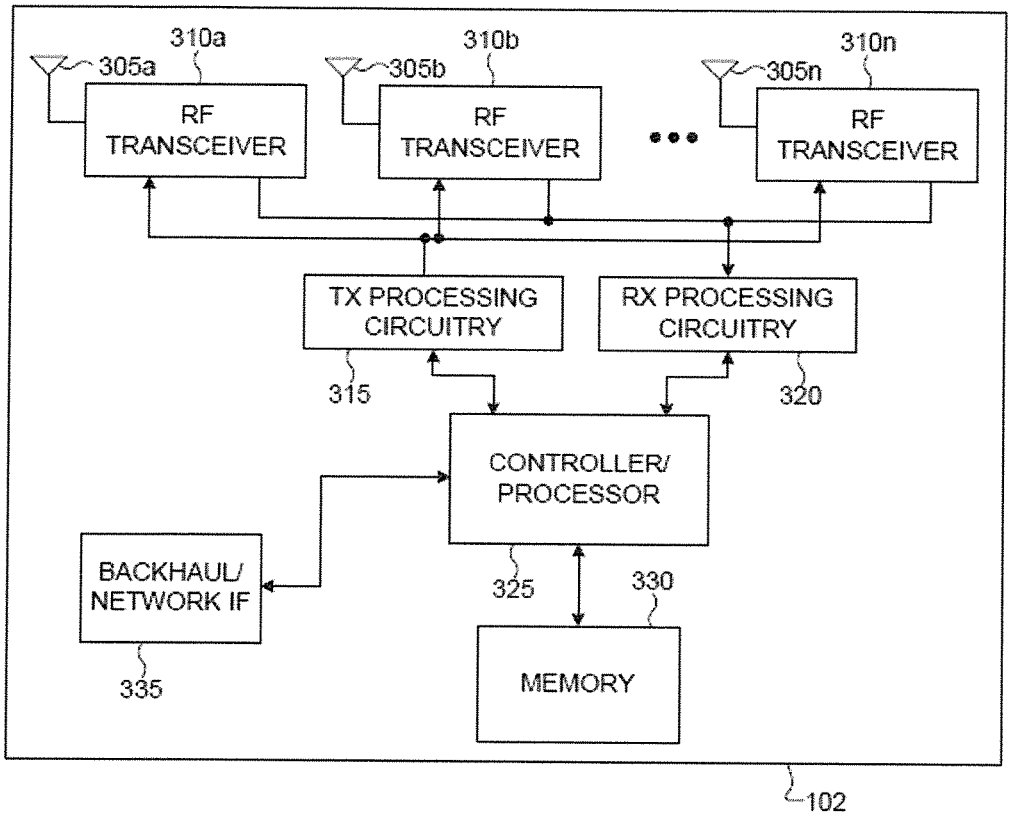
FIG. 3 illustrates an example enhanced ENB (eNB) according to this disclosure.

FIG. 3 illustrates an example eNB 102 according to this disclosure. The embodiment of the eNB 102 shown in FIG. 3 is for illustration only, and other eNBs of FIG. 1 could have the same or similar configuration. However, eNBs come in a wide variety of configurations, and FIG. 3 does not limit the scope of this disclosure to any particular implementation of an eNB.

As shown in FIG. 3, the eNB 102 includes multiple antennas 305a-305n, multiple RF transceivers 310a-310n, transmit (TX) processing circuitry 315, and receive (RX) processing circuitry 320. The eNB 102 also includes a controller/processor 325, a memory 330, and a backhaul or network interface 335.

The RF transceivers 310a-310n receive, from the antennas 305a-305n, incoming RF signals, such as signals transmitted by UEs or other eNBs. The RF transceivers 310a-310n down-convert the incoming RF signals to generate IF or baseband signals. The IF or baseband signals are sent to the RX processing circuitry 320, which generates processed baseband signals by filtering, decoding, and/or digitizing the baseband or IF signals. The RX processing circuitry 320 transmits the processed baseband signals to the controller/processor 325 for further processing.

The TX processing circuitry 315 receives analog or digital data (such as voice data, web data, e-mail, or interactive video game data) from the controller/processor 325. The TX processing circuitry 315 encodes, multiplexes, and/or digitizes the outgoing baseband data to generate processed baseband or IF signals. The RF transceivers 310a-310n receive the outgoing processed baseband or IF signals from the TX processing circuitry 315 and up-converts the baseband or IF signals to RF signals that are transmitted via the antennas 305a-305n.

The controller/processor 325 can include one or more processors or other processing devices that control the overall operation of the eNB 102 such as operations for broadcast signaling in a normal mode or in an enhanced coverage mode. For example, the controller/processor 325 could control the reception of forward channel signals and the transmission of reverse channel signals by the RF transceivers 310a-310n, the RX processing circuitry 320, and the TX processing circuitry 315 in accordance with well-known principles. The controller/processor 325 could support additional functions as well, such as more advanced wireless communication functions. For instance, the controller/processor 325 could support beam forming or directional routing operations in which outgoing signals from multiple antennas 305a-305n are weighted differently to effectively steer the outgoing signals in a desired direction. Any of a wide variety of other functions could be supported in the eNB 102 by the controller/processor 325. In some embodiments, the controller/processor 325 includes at least one microprocessor or microcontroller.

The controller/processor 325 is also capable of executing programs and other processes resident in the memory 330, such as a basic OS. The controller/processor 325 can move data into or out of the memory 330 as required by an executing process.

The controller/processor 325 is also coupled to the backhaul or network interface 335. The backhaul or network interface 335 allows the eNB 102 to communicate with other devices or systems over a backhaul connection or over a network. The interface 335 could support communications over any suitable wired or wireless connection(s). For example, when the eNB 102 is implemented as part of a cellular communication system (such as one supporting 5G, LTE, or LTE-A), the interface 335 could allow the eNB 102 to communicate with other eNBs over a wired or wireless backhaul connection. When the eNB 102 is implemented as an access point, the interface 335 could allow the eNB 102 to communicate over a wired or wireless local area network or over a wired or wireless connection to a larger network (such as the Internet). The interface 335 includes any suitable structure supporting communications over a wired or wireless connection, such as an Ethernet or RF transceiver.

The memory 330 is coupled to the controller/processor 325. Part of the memory 330 could include a RAM, and another part of the memory 330 could include a Flash memory or other ROM.

In certain embodiments, the BS 102 includes an encoder configured to encode a first DCI format or a second DCI format. The encoder can be implemented by separate processing circuitry configured to perform the encoding operation. In certain embodiments, the encoder operations are performed by the controller/processor 325 based on instructions stored in memory 330.

As described in more detail below, the transmit and receive paths of the eNB 102 (implemented using the RF transceivers 310a-310n, TX processing circuitry 315, and/or RX processing circuitry 320) support broadcast signaling in a normal mode or in an enhanced coverage mode.

Although FIG. 3 illustrates one example of an eNB 102, various changes can be made to FIG. 3. For example, the eNB 102 could include any number of each component shown in FIG. 3. As a particular example, an access point could include a number of interfaces 335, and the controller/processor 325 could support routing functions to route data between different network addresses. As another particular example, while shown as including a single instance of TX processing circuitry 315 and a single instance of RX processing circuitry 320, the eNB 102 could include multiple instances of each (such as one per RF transceiver).

A transmission time interval (TTI) for DL signaling or UL signaling is referred to as a subframe (SF) and includes two slots. A unit of ten SFs is referred to as a frame. A bandwidth (BW) unit is referred to as a resource block (RB), one RB over one slot is referred to as a physical RB (PRB) and one RB over one SF is referred to as a PRB pair.

In some wireless networks, DL signals include data signals conveying information content, control signals conveying DL control information (DCI), and reference signals (RS) which are also known as pilot signals. The eNB 102 transmits data information through respective physical DL shared channels (PDSCHs). The eNB 102 transmits DCI through respective physical DL control channels (PDCCHs). The eNB 102 can also transmit a physical Hybrid-ARQ indicator channel (PHICH) conveying positive acknowledgements (ACKs) or negative acknowledgements (NACKs) corresponding to hybrid automatic repeat request (HARQ) processes to UEs regarding respective previous data transport block (TB) transmissions from the UEs. The eNB 102 can transmit one or more of multiple types of RS including a UE-common RS (CRS), a channel state information RS (CSI-RS), and a demodulation RS (DMRS)—see also REF 1. The eNB 102 transmits a CRS over a DL system BW and the CRS can be used by UEs to demodulate data or control signals or to perform measurements. To reduce CRS overhead, eNB 102 can transmit a CSI-RS with a smaller density in the time and/or frequency domain than a CRS. UE 114 can determine CSI-RS transmission parameters through higher layer signaling from eNB 102. DMRS is transmitted only in the BW of a respective PDSCH or PDCCH and UE 114 can use the DMRS to demodulate information in the PDSCH or the PDCCH.

In some wireless networks, UL signals include data signals conveying data information, control signals conveying UL control information (UCI), and UL RS. UE 114 transmits data information or UCI through a respective physical UL shared channel (PUSCH) or a physical UL control channel (PUCCH). When UE 114 needs to transmit data information and UCI in a same UL SF, UE 114 can multiplex both in a PUSCH. UCI includes HARQ acknowledgement (HARQ-ACK) information indicating correct (ACK) or incorrect (NACK) detection for data TBs in a PDSCH or absence of a PDCCH detection (DTX) for a DL SF, scheduling request (SR) indicating whether UE 114 has data in its buffer, and rank indicator (RI) and channel state information (CSI) enabling eNB 102 to select appropriate parameters for PDSCH transmissions to UE 114. HARQ-ACK information is also transmitted by UE 114 in response to a detection of a PDCCH indicating a release of semi-persistently scheduled (SPS) PDSCH (see also REF 3); for brevity, this is not explicitly mentioned in the following descriptions. CSI transmission can be periodic (P-CSI) in a PUCCH with parameters configured to UE 114 from eNB 102 by higher layer signaling, such as for example radio resource control (RRC) signaling, or aperiodic (A-CSI) in a PUSCH as triggered by an A-CSI request information element (IE) included in a DCI format scheduling a PUSCH (UL DCI format—see also REF 2).

UL RS includes DMRS and sounding RS (SRS). UE 114 transmits DMRS only in a BW of a respective PUSCH or PUCCH. The eNB 102 can use a DMRS to demodulate data signals or UCI signals. A DMRS is transmitted using a Zadoff-Chu (ZC) sequence having a cyclic shift (CS) and an orthogonal covering code (OCC) that eNB 102 can inform to UE 114 through a respective UL DCI format (see also REF 2) or configure by higher layer signaling. UE 114 transmits SRS to provide eNB 102 with an UL CSI. SRS transmission can be periodic (P-SRS) at predetermined SFs with parameters configured to UE 114 from eNB 102 by higher layer signaling or it can be aperiodic (A-SRS) as triggered by a DCI format scheduling PUSCH or PDSCH (DL DCI format) (see also REF 2 and REF 3). UL HARQ is synchronous and the PDCCH, PUSCH, PHICH or PDCCH, and PUSCH retransmission follow a predetermined timing relation (see also REF 3). UE 114 can adjust a transmission power for a PUSCH or for a PUCCH according to a transmit power control (TPC) command in a DCI format scheduling the PUSCH or a PDSCH, respectively (see also REF 2).

An UL HARQ operation can be synchronous and, for a FDD system and for an UL DCI format detection in SF n, UE 114 transmits a data TB in a respective PUSCH in n+4 and detects a PHICH or an UL DCI format in SF n+8 to determine whether to retransmit the data TB or to transmit a new data TB. Therefore, a HARQ round trip time (RTT) is 8 msec.

Data information is transmitted with a modulation and coding scheme (MCS) identified by a modulation order $Q'_m$ ($Q'_m=2$ for QPSK, $Q'_m=4$ for QAM16, and $Q'_m=6$ for QAM64) and a coding rate for a turbo code. Based on the MCS and the RB assignment, UE 114 can determine a TB size (TBS) for a data TB. Retransmissions of a data TB, either in a PDSCH or in a PUSCH, can be by using incremental redundancy (IR) identified by a redundancy version (RV). When all retransmissions of a data TB are with a same RV as used for the initial transmission of the data TB (RV0), chase combining (CC) applies. A new data indicator (NDI) IE in a DCI format indicates whether a respective PDSCH or PUSCH conveys a transmission of a new data TB or a retransmission of a previous data TB (see also REF 2). A PDSCH or a PUSCH transmission can be distributed in a BW by using Frequency Hopping (FH) or can be localized in a BW without using FH. An associated DCI format provides a respective indication.

DCI can serve several purposes. A DCI format in a respective PDCCH includes IEs and is typically used for scheduling a PDSCH (DL DCI format) or a PUSCH (UL DCI format) transmission. A DCI format includes cyclic redundancy check (CRC) bits in order for a UE to confirm a correct detection. A DCI format type is identified by a radio network temporary identifier (RNTI) that scrambles the CRC bits. For a DCI format scheduling a PDSCH or a PUSCH for a single UE, such as UE 114, with RRC connection to eNB 102, the RNTI is a cell RNTI (C-RNTI). For a DCI format scheduling a PDSCH conveying system information (SI) to a group of UEs, the RNTI is a SI-RNTI. For a DCI format scheduling a PDSCH providing a random access response (RAR) to a random access (RA) preamble transmission from a group of UEs, the RNTI is a RA-RNTI. For a DCI format scheduling a PDSCH providing contention resolution in Msg4 of a RA process, the RNTI is a temporary C-RNTI (TC-RNTI). For a DCI format scheduling a PDSCH paging a group of UEs, the RNTI is a P-RNTI. For a DCI format providing TPC commands to a group of UEs, the RNTI is a TPC-RNTI. Each RNTI type is configured to UE 114 by eNB 102 through higher layer signaling (and the C-RNTI is unique for each UE). Additionally, SPS can be used to schedule PDSCH transmissions to or PUSCH transmissions from UE 114 without eNB 102 having to transmit a DCI format. With SPS, UE 114 is configured by eNB 102 through higher layer signaling parameters to periodically receive a PDSCH or transmit a PUSCH. PDCCH transmissions and PDSCH transmission can be either time division multiplexed (TDM) or frequency division multiplexed (FDM)—see also REF 1 and REF 3. The PDCCH and PDSCH multiplexing method is not material to the purposes of the present disclosure. Different DCI formats can be associated with different PDSCH or PUSCH transmission modes (TMs) configured to UE 114 (see also REF 2 and REF 3).

Table 1 provides IEs for an UL DCI format scheduling a PUSCH transmission with a maximum of one data TB within a BW of $N_{RB}^{UL}$ RBs.

TABLE 1

| IEs of a DCI Format Scheduling PUSCH (DCI Format 0 - see also REF 2) | | |
| --- | --- | --- |
| DCI Format 0 IE | Number of Bits | Functionality |
| Differentiation Flag | 1 | Differentiates DCI Format 0 from DCI Format 1A having a same size |
| RB assignment and hopping resource allocation | $\lceil \log_2(N_{RB}^{UL}(N_{RB}^{UL} + 1)/2) \rceil$ | Assigns RB for PUSCH transmission |
| FH Flag | 1 | Indicates whether or not the PUSCH transmission is with FH |
| MCS and RV | 5 | Provides the MCS and RV for the data TB |
| NDI | 1 | Indicates whether PUSCH conveys transmission or re-transmission of data TB |
| TPC Command | 2 | Adjusts PUSCH transmission power |
| CS and OCC Index $n_{DMRS}$ | 3 | CS and OCC for PUSCH DMRS |
| CSI Request | 1 | Indicates whether UE shall include a CSI report in the PUSCH transmission |
| SRS Request | 1 | Indicates whether UE shall transmit SRS |
| DL Assignment Index (DAI) or UL index - for TDD | 0 (FDD) or 2 (TDD) | Indicates number of HARQ-ACK bits for UE to include in PUSCH (DAI) or indicated one or two SFs for PUSCH for UL/DL configuration 0 (UL index) |
| Padding Bits | 1 | When needed to provide equal size for DCI Format 0 and DCI Format 1A |
| C-RNTI | 16 | UE identification |
| Total | 43 (FDD) or 47 (TDD) | Assuming $N_{RB}^{UL} = 50$ |

Table 2 provides IEs for a DCI format scheduling a PDSCH transmission with a maximum of one data TB within a BW of $N_{RB}^{DL}$ RBs.

TABLE 2

| IEs of a DCI Format Scheduling PDSCH (DCI Format 1A - see also REF 2) | | |
| --- | --- | --- |
| DCI Format 1A IE | Number of Bits | Functionality/Indication |
| Differentiation Flag for DCI Format 0 vs. DCI Format 1A | 1 | Differentiates DCI Format 0 from DCI Format 1A having a same size |
| RB assignment | $\lceil \log_2(N_{RB}^{DL}(N_{RB}^{DL} + 1)/2) \rceil$ | RBs for PDSCH transmission |
| Distributed/Localized Transmission Flag | 1 | Whether or not the UE shall transmit the PDSCH using frequency hopping |
| MCS | 5 | MCS for the data TB |
| NDI | 1 | Whether PUSCH conveys transmission or re-transmission of data TB |
| RV | 2 | RV for the HARQ process |
| HARQ Process Number | 3 (FDD) or 4 (TDD) | HARQ process number |
| TPC Command | 2 | Power adjustment for a PUCCH in response to data TB reception |
| SRS Request | 1 | Indicates whether UE shall transmit SRS |
| DAI - for TDD | 0 (FDD) or 2 (TDD) | Indicates number of DCI formats within a number of DL SFs for which HARQ-ACK transmission is in same UL SF |
| Padding Bits | 0 | When needed to provide equal size for DCI Format 0 and DCI Format 1A |
| RNTI | 16 | UE Identification |
| Total (FDD) | 43 (FDD) or 47 (TDD) | Assuming $N_{RB}^{DL} = 50$ |

UE 114 shall use the MCS index, $I_{MCS}$, in a DCI Format 0 according to Table 3 to map to a modulation order, a TBS index, and a RV. UE 114 can then determine the TBS in the PUSCH based on the RB assignment as described in REF 3.

TABLE 3

Modulation, TBS index, and RV for PUSCH (see also REF 3)

| MCS Index $I_{MCS}$ | Modulation Order $Q_m'$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

UE 114 shall use the MCS index, $I_{MCS}$, in a DCI Format 1A according to Table 4 to determine a modulation order ($Q_m$) used in a respective PDSCH transmission. Based on the mapping of a MCS index to a modulation order and a TBS index, UE 114 can then determine the TBS in the PDSCH based on the RB assignment as described in REF 3.

TABLE 4

Modulation and TBS index table for PDSCH (see also REF 3)

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

Figure 4:
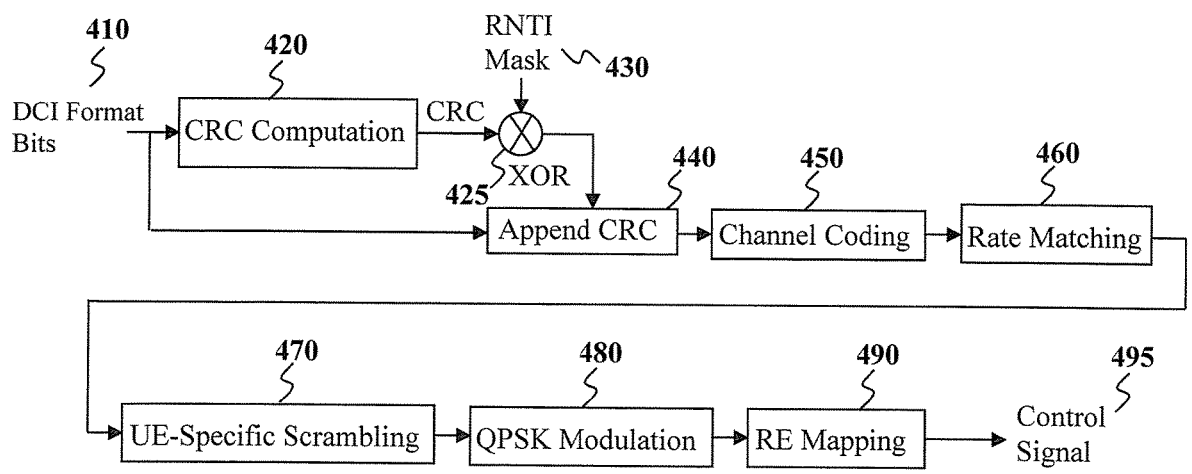
FIG. 4 illustrates an example encoding process for a DCI format according to this disclosure.

FIG. 4 illustrates an example encoding process for a DCI format according to this disclosure. The embodiment of the encoding process shown in FIG. 4 is for illustration only. Other embodiments could be used without departing from the scope of the present disclosure.

The eNB 102 separately encodes and transmits each DCI format in a respective PDCCH. A RNTI configured to UE 116 that a DCI format is intended for, masks a CRC of the DCI format codeword in order to enable UE 116 to identify the DCI format is intended for UE 116. The CRC of (non-encoded) DCI format bits 410 is computed using a CRC computation operation 420, and the CRC is then masked using an exclusive OR (XOR) operation 425 between CRC and RNTI bits 430. The XOR operation 425 is defined as: XOR(0,0)=0, XOR(0,1)=1, XOR(1,0)=1, XOR(1,1)=0. The masked CRC bits are appended to DCI format information bits using a CRC append operation 440, channel coding is performed using a channel coding operation 450 (such as an operation using a convolutional code with tail biting—see also REF 2), followed by rate matching 460, scrambling with a UE-specific scrambling sequence 470 (another XOR operation), modulation 480 using for example QPSK, and the modulated symbols of the encoded DCI format are mapped to REs 490 (see also REF 1), and the output control signal 495 is transmitted in a PDCCH. For example, both a CRC and a RNTI include 16 bits.

Figure 5:
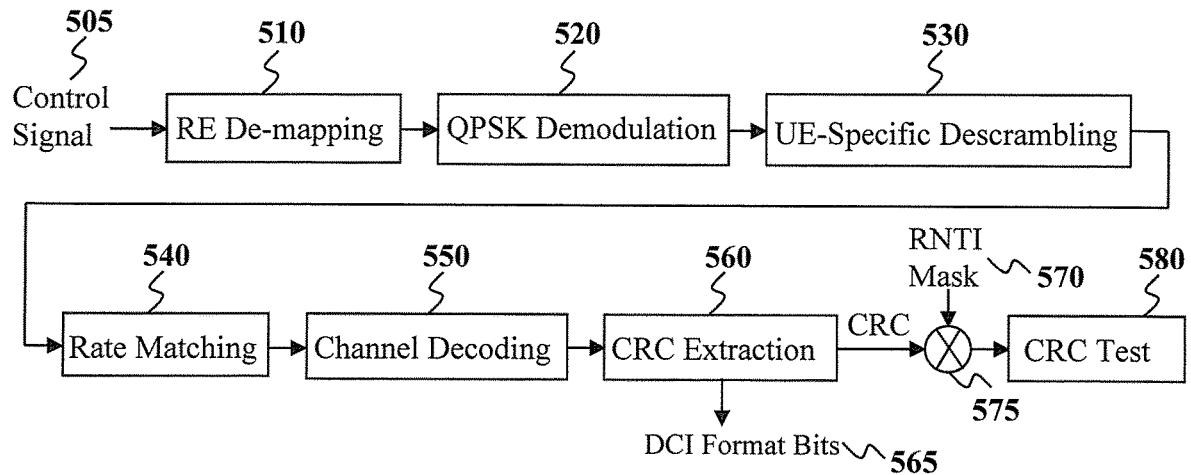
FIG. 5 illustrates an example encoding process for a DCI format according to this disclosure.

FIG. 5 illustrates an example decoding process for a DCI format according to this disclosure. The embodiment of the decoding process shown in FIG. 5 is for illustration only. Other embodiments could be used without departing from the scope of the present disclosure.

UE 116 receives REs for a control signal 505 in a PDCCH, de-maps the REs 510 according to a search space for a PDCCH candidate (see also REF 3), and demodulates received symbols of a presumed DCI format 520. The demodulated symbols are subsequently descrambled by applying an XOR operation with a complex conjugate of a UE-specific scrambling sequence 530. A rate matching applied at eNB 102 transmitter is restored 540 followed by channel decoding 550, such as convolutional decoding with tail biting. After decoding, UE 116 obtains DCI format bits 565 after extracting CRC bits 560. The CRC bits 560 are then de-masked 570 by applying the XOR operation with a RNTI associated with the DCI format 570. Finally, UE 116 performs a CRC check 580. When the CRC check is positive and the contents of the DCI format are valid, UE 116 determines that the DCI format is valid and UE 116 acts according to the DCI format functionality; otherwise, UE 116 disregards the presumed DCI format.

The eNB 102 transmitter and the UE 114 receiver block diagrams for a data TB reception in a PDSCH are similar to the respective ones for a DCI format in a PDCCH, with some exceptions such as that different rate matching can apply, the encoder/decoder can be for turbo coding instead of tail biting convolutional coding, and there is no RNTI mask scrambling the CRC, and are not shown for brevity.

One of the fundamental requirements in an operation of a communication system is a capability for a UE to request a connection setup or to establish synchronization with an eNB; such request is commonly referred to as random access (RA). RA is used for several purposes, including: initial access when establishing a radio link; re-establishing a radio link after radio-link failure, handover when UL synchronization needs to be established to a new cell, UL synchronization, UE positioning based on UL measurements, and as SR when no dedicated SR resources are configured to the UE on a PUCCH. Acquisition of UL timing at an eNB is one of the main objectives of RA; when establishing an initial radio link, a RA process also serves for assigning a C-RNTI to a UE. Either a contention based (multiple UEs can use same resources) or a contention-free (a dedicated resource is used by a UE) RA scheme can be used. For contention based RA, a UE obtains the necessary information for RA preamble transmission through System Information Blocks (SIBs) transmitted from an eNB (see REF 1 and REF 5).

Figure 6:
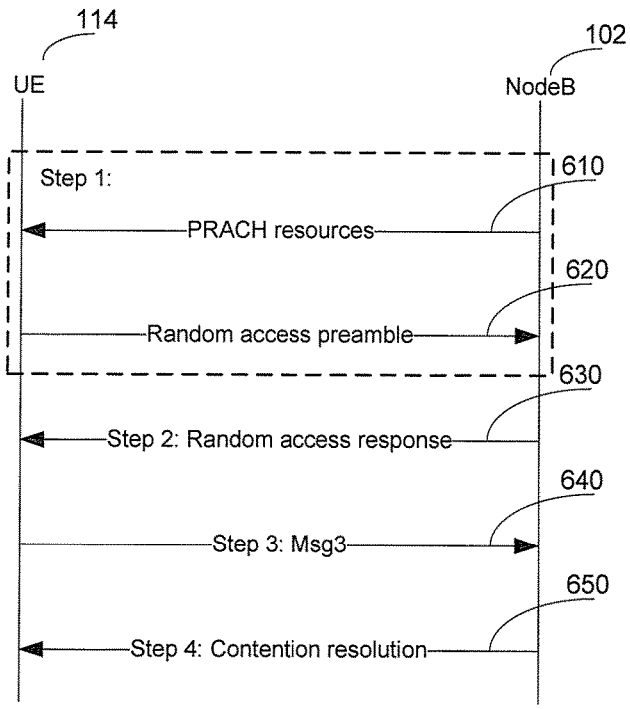
FIG. 6 illustrates an example RA process according to this disclosure.

FIG. 6 illustrates an example RA process according to this disclosure. The embodiment of the RA process shown in FIG. 6 is for illustration only. Other embodiments could be used without departing from the scope of the present disclosure.

In Step 1, a UE 114 acquires information for physical random access channel (PRACH) resources 610 by detecting a SIB transmitted from an eNB 102 and the UE 116 determines PRACH resources for transmission of a RA preamble 620 (also referred to as PRACH preamble). In Step 2, the UE 114 detects a random access response (RAR) message 630 from the eNB 102. In Step 3, the UE 114 transmits what is referred to as message 3 (Msg3) 640 to the eNB. In Step 4, the eNB 102 and the UE 114 perform contention resolution 650 and the message in this step is referred to as message 4 (Msg4).

A medium access control (MAC) packet data unit (PDU) consists of a MAC header and zero or more MAC RARs corresponding to RA preambles that a transmitting eNB, such as eNB 102, detected (see also REF 4). A MAC PDU header consists of one or more MAC PDU subheaders that each includes 8 binary elements (bits)—see also REF 4. A MAC RAR consists of a reserved IE (R) that includes one bit, a timing advance (TA) command that includes 11 bits, an UL grant that includes 20 bits and schedules a Msg3 transmission and a TC-RNTI that includes 16 bits (see also REF 4). A UE, such as UE 114, uses the TC-RNTI to scramble a Msg3 transmission and to detect a DCI format scheduling Msg4 for contention resolution. The UL grant includes a hopping flag IE of 1 bit, a fixed size RB assignment IE of 10 bits, a truncated MCS IE of 4 bits, a TPC command IE of 3 bits for the Msg3 transmission in a PUSCH, and UL delay IE of 1 bit, and a CSI request IE of 1 bit (see also REF 3 and REF 4).

Figure 7:
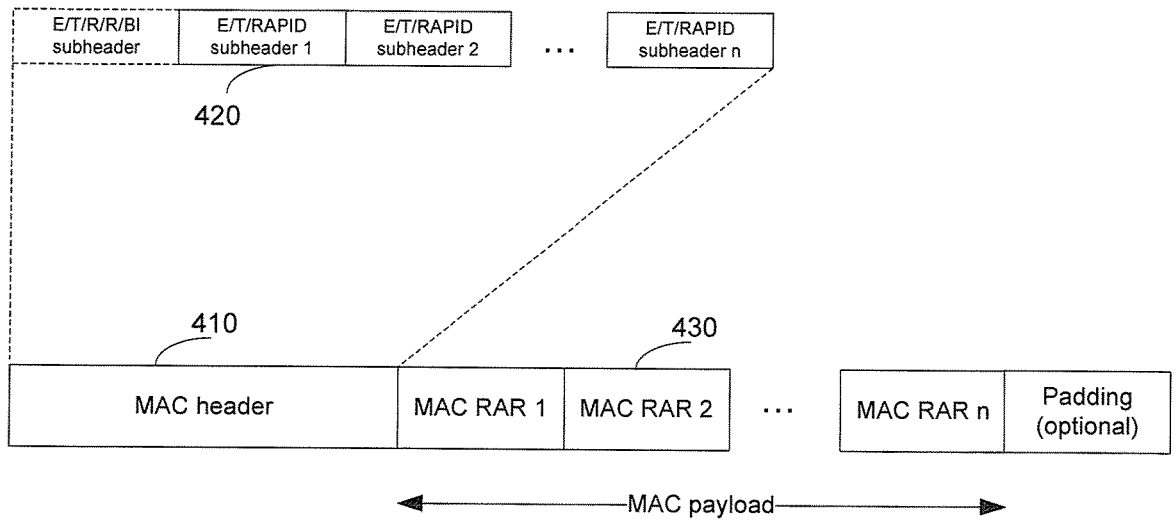
FIG. 7 illustrates an exemplary MAC RAR PDU that includes a header and a number of individual RAR messages according to this disclosure.

FIG. 7 illustrates an exemplary MAC RAR PDU that includes a header and a number of individual RAR messages according to this disclosure. The embodiment of the MAC RAR PDU shown in FIG. 7 is for illustration only. Other embodiments could be used without departing from the scope of the present disclosure.

A MAC RAR PDU header 710 consists of one or more MAC RAR PDU subheaders 720; each subheader corresponding to a MAC RAR, except for the Backoff Indicator subheader, and zero or more MAC RARs 730 (see also REF 4). A MAC RAR consists of the four fields R/TA Command/UL Grant/TC-RNTI.

Machine Type Communications (MTC) refers to communication of automated UEs in a network. Compared to typical human communication, MTC typically has relaxed latency and Quality of Service (QoS) requirements and often does not require mobility support. However, MTC also requires that respective UEs have reduced cost and reduced power consumption compared to UEs serving human communications. Low cost UEs for MTC can be used for a wide variety of applications in different sectors including healthcare, such as monitors, industrial, such as safety and security, energy, such as meters and turbines, transport, such as fleet management and tolls, and consumer and home, such as appliances and power systems.

Cost reduction for low cost UEs can be obtained both from the Radio-Frequency (RF) operation and from the Digital Base-Band (DBB) operation. This can be realized by reducing a transmission BW and a reception BW, or reducing the number of UE receiver antennas (and as consequence, low cost UEs do not need to report RI or support TMs requiring the existence of multiple antennas). Reduction of a reception BW can lead to reduced frequency diversity and a single UE receiver antenna can lead both to reduced received signal power and absence of receiver antenna diversity. The combined effect of such operating conditions can be a degraded reception reliability of signaling and a reduced coverage for low cost UEs relative to conventional UEs. Coverage can be further degraded by the location of UEs that can often be in basements of building or, in general, in locations where propagation of radio signals experiences substantial path-loss. For these reasons, supporting coverage enhancements is an essential feature for a communication system.

To allow for repetitions of a transmission to or from a UE to experience frequency diversity and therefore improve respective reception reliability, each repetition can be transmitted in different BW parts of a system BW according to a FH pattern.

Coverage for a message transmitted to or from UEs can also be improved by reducing its size. This can be readily feasible for unicast communications by reducing a respective data rate for the message. However, reducing a data rate for the message is not possible for conventional UE-common broadcast messages, such as the RAR, that incorporate information for multiple UEs.

Figure 8:
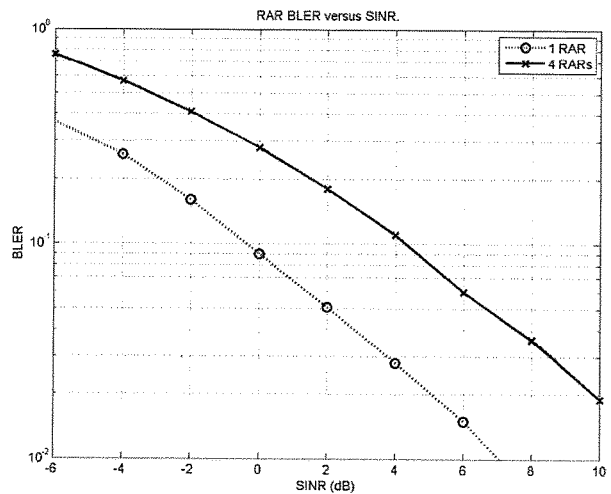
FIG. 8 illustrates a Block Error Rate (BLER) for a RAR that includes 1 or 4 individual RAR messages.

FIG. 8 illustrates a Block Error Rate (BLER) for a RAR that includes 1 or 4 individual RAR messages. The embodiment of the BLER shown in FIG. 8 is for illustration only. Other embodiments could be used without departing from the scope of the present disclosure.

For a UE with one receiver antenna, an eNB with two transmitter antennas, a RAR transmission BW of 6 RBs and for a target BLER of 0.01, a signal to interference and noise ratio (SINR) above 10 deci-Bell (dB) is required for a RAR that includes 4 individual RAR messages. Even for a RAR that includes only 1 individual message, a SINR above 7 dB is required for a target BLER of 0.01. Considering that UEs can experience SINR in the range of −3 dB to −6 dB due to interference and even lower SINRs when they experience a large propagation loss, it can be concluded that a conventional RAR message can require repetitions to achieve a desired BLER target especially as it likely that the eNB transmitting the RAR message does not know the SINR experienced by UEs the RAR message intends to address. Therefore, to limit the number of repetitions of a RAR message, it can be beneficial to reduce the size of each individual RAR message.

A spectral efficiency of a communication system is negatively impacted from dynamically scheduling small messages for unicast communication. This is because of an increased ratio between resources required to transmit a DCI format scheduling a PDSCH transmission to or a PUSCH transmission from a UE and resources required to transmit the respective PDSCH or PUSCH. Equivalently, a relative overhead, as represented by resources required to transmit a DCI format, increases since a size of the information message decreases. Reducing a DCI format size can mitigate an increase of a relative overhead for scheduling a PDSCH or PUSCH but this can only have limited benefits as the size of an information message can typically decrease significantly more than a size of a respective DCI format. Therefore, to improve spectral efficiency, different UE-specific DCI formats can be designed considering the coverage requirements for a UE. Furthermore, PDSCH or PUSCH scheduling can be for a group of UEs using a single DCI format.

One component of the RF functionality for a UE is the oscillators and the duplexer that can allow the UE to simultaneously transmit in an UL frequency band and receive in a DL frequency band for a frequency division duplex (FDD) system. Such a UE capability is referred to as full-duplex (FD) capability. To avoid the duplexer cost, half-duplex (HD) UEs with one oscillator can be used. A HD-FDD UE cannot simultaneously transmit and receive since the HD-FDD UE is required to switch the oscillator between an UL frequency band and a DL frequency band. For a HD-FDD UE with one oscillator, each of the DL-to-UL switching time and the UL-to-DL switching time is assumed to be one SF but other switching times can also apply. The existence of DL-to-UL and of UL-to-DL switching SFs decreases a number of SFs per frame where a HD-FDD UE can transmit or receive and therefore reduces a respective UL data rate or DL data rate.

For many MTC applications, traffic can be either UL-dominant or DL-dominant. In case of UL-dominant traffic, such as from metering devices, information packets are generated from a HD-FDD UE and transmitted to an eNB while information from the eNB to the HD-FDD UE is typically limited to UL DCI formats, when SPS is not used, and to RRC (re)configuration messages that can be provided either individually to the HD-FDD UE or, more efficiently when appropriate, by paging a group of HD-FDD UEs. In case of DL-dominant traffic, such as for vehicle coordination, information packets are generated from an eNB and are transmitted to a HD-FDD UE while information from the HD-FDD UE is typically limited to HARQ-ACK and possibly CSI. Therefore, an eNB can configure a configuration of DL SFs and UL SFs per frame to a HD-FDD UE by higher layer signaling, such as RRC signaling, and different HD-FDD UEs can have different configurations depending, for example, on whether a respective data traffic is UL-dominant or DL-dominant. Therefore, to adjust scheduling to a DL data rate and an UL data rate suitable for a particular HD-FDD UE and to increase such data rates, UE-specific configurations of DL SFs and UL SFs can apply.

Embodiments of this disclosure provide mechanisms to improve spectral efficiency, coverage, and data rates for communication between an eNB and UEs. Embodiments of this disclosure provide mechanisms to reduce a RAR message size in order to reduce a respective number of repetitions for a RAR message transmission. Additionally, embodiments of this disclosure provide mechanisms to support UE-group scheduling in order to reduce a relative control overhead for PDSCH transmission to or PUSCH transmissions from UEs. Further, embodiments of this disclosure provide designs for UE-specific DCI formats according to a coverage requirement for a UE. Finally, embodiments of this disclosure provide designs for allocation of DL SFs and UL SFs in order to adjust a DL data rate and an UL data rate and in order to minimize switching between DL and UL for a HD-FDD UE.

The following embodiments are not limited to low cost UEs and can be applicable to any type of UEs requiring coverage enhancements. Moreover, although the descriptions consider SF structures with symbols having a normal Cyclic Prefix (CP), they are also applicable for SF structures with symbols having an extended CP (see also REF 1).

A first embodiment of the disclosure considers a design of individual RAR messages with reduced (compact) size. A conventional RAR message is associated with a sub-header that includes 8 bits and a MAC RAR that includes 48 bits. A reserved bit can be avoided in the sub-header. A compact RAR message can include a MAC RAR that differs from a conventional RAR message according to at least one of the following:

Hopping Flag IE: A 1-bit hopping flag need not exist in a compact RAR message as a transmission BW for a PDSCH conveying the compact RAR message is at most 6 RBs. Therefore, FH for the PDSCH transmission between slots of a SF can be specified to occur (or to not occur) in the system operation or can be indicated by a SIB. Therefore, a respective indication in the compact RAR message is not necessary. For repetitions of a PDSCH transmission conveying a compact RAR message, a SIB can indicate whether or not FH applies among repetitions.

RB Assignment IE: The 10-bit RB assignment for transmission of Msg3 by a UE can be reduced in size or can be removed in a compact RAR message depending on an approach used for determining a transmission BW for Msg3.

In a first approach, a UE transmits Msg3 within a same narrow-band of $N_{RB}^{UL}=6$ successive RBs as for an associated RA preamble. The RB assignment within the narrow-band can be provided as for resource allocation type 2 (see REF 3) using $\lceil \log_2(N_{RB}^{UL} \cdot (N_{RB}^{UL}+1)/2) \rceil = 5$ bits where $\lceil \: \rceil$ is the ceiling function that rounds a number to its immediately next integer. In a second approach, a UE transmits Msg3 within a same narrow-band of $N_{RB}^{UL}=6$ successive RBs as an associated RA preamble. A PUSCH conveying the Msg3 is configured to be transmitted in a number of RBs, such as 1 RB, particularly when the UE transmits Msg3 with repetitions. The configuration can be by signaling in a SIB or can be specified in the system operation. The RB assignment can indicate an enumeration of RBs with the narrow-band. For example, the RB assignment can include 3 bits when the PUSCH is transmitted in 1 RB, 2 bits when the PUSCH is transmitted in 2 RBs, or 1 bit when the PUSCH is transmitted in 3 RBs for the $N_{RB}^{UL}=6$ RBs where the indexing starts from the RB with the smallest index with the narrow-band. For example, for Msg3 transmissions configured to occur in 1 RB, a 3-bit RB assignment IE can indicate a first RB with a '000' binary value, a second RB with a '001' binary value, and so on.

In a third approach, a UE can transmit Msg3 in a different narrow-band of $N_{RB}^{UL}=6$ successive RBs than a narrow-band of an associated RA preamble. The narrow-band of $N_{RB}^{UL}=6$ RBs is indicated by a SIB and can be further associated with the RA preamble index. When an Msg3 transmission is with repetitions and FH among repetitions applies over two narrow-bands, the second narrow-band can be implicitly determined, for example to be symmetric to the first narrow-band relative to the center or relative to the edge of the UL system BW. When FH for repetitions of an Msg3 transmission can be over a predefined number of $N_{NB}^{Msg3}$ narrow-bands, the $N_{NB}^{Msg3}$ narrow-bands can be signaled in a SIB. The RB assignment with a narrow-band can be provided in a same manner as for the first approach or the second approach.

In a fourth approach, a UE can transmit Msg3 in a different narrow-band of $N_{RB}^{UL}=6$ successive RBs than a narrow-band of an associated RA preamble transmission. The narrow-band can be indicated to the UE by a RAR message using $\lceil \log_2 N_{NB} \rceil$ bits where $N_{NB}$ is a number of narrow-bands in an UL system BW. When a Msg3 transmission is with repetitions and FH among repetitions applies over two narrow-bands, the signaling for a narrow-band for the first repetition can be with $\lceil \log_2(N_{NB}/2) \rceil$ bits and the UE can implicitly determine the second narrow-band, for example to be symmetric to the first narrow-band relative to the center or relative to the edge of the UL system BW. When FH is over a predefined number of $N_{NB}^{Msg3}$ narrow-bands that can be signaled in a SIB, the signaling of a narrow-band for a first repetition of an Msg3 transmission can be with $\lceil \log_2 N_{NB}^{Msg3} \rceil$ bits. A RB assignment within a narrow-band can be based on resource allocation type 2 using $\lceil \log_2(N_{RB}^{UL} \cdot (N_{RB}^{UL}+1)/2) \rceil = 5$ bits or, when Msg3 transmission is in one RB, by enumeration of the RB.

In a fifth approach, a UE transmits Msg3 in a narrow-band of $N_{RB}^{UL}=6$ successive RBs determined as in one of the previous approaches. The RB assignment within the narrow-band can be removed and a UE can transmit a PUSCH conveying the Msg3 in a predetermined number of RBs within the narrow-band of $N_{RB}^{UL}=6$ RBs in a same order as the location of the associated RAR message in the MAC RAR PDU. For example, when each UE with Msg3 transmission within the narrow-band of $N_{RB}^{UL}=6$ RBs transmits a respective PUSCH in 1 RB, a UE with individual RAR message located first in the MAC RAR PDU transmits the PUSCH in the first RB of the $N_{RB}^{UL}=6$ RBs, a UE with individual RAR message located second in the MAC RAR PDU transmits the PUSCH in the second RB of the $N_{RB}^{UL}=6$ RBs, and so on. The fifth approach can be particularly suitable to UEs operating in a coverage enhanced mode and for a MAC RAR PDU addressing such UEs.

MCS IE: The 4-bits MCS can be reduced in size or removed in a compact RAR message. In a first approach, the MCS is reduced to 3 bits such that the MCS for Msg3 transmission is determined from 8 MCS indexes associated with QPSK modulation in Table 3, such as MCS indexes 0 through 7.

In a second approach, the MCS is reduced to 2 bits such that the MCS for Msg3 transmission is determined from 4 MCS indexes associated with QPSK modulation in Table 3, such as MCS indexes 0, 2, 4, and 6.

In a third approach, the MCS is reduced to 1 bit such that the MCS for Msg3 transmission is determined from 2 MCS indexes associated with QPSK modulation in Table 3, such as index 0 and index 4.

In a fourth approach, when a UE transmits Msg3 with repetitions, the MCS is removed and the MCS for the Msg3 transmission is MCS index 0 in Table 3 or another predetermine MCS index that can be associated with a respective RA preamble for one of two possible groups of RA preambles (see also REF 1).

TPC command IE: The 3-bit TPC command for a PUSCH transmission conveying Msg3 can be reduced in size, such as to 2 bits. The 3-bit TPC command can be removed when Msg3 is transmitted with repetitions and a UE can use a maximum transmission power.

A UE can select a narrow-band of 6 successive RBs for its RA preamble transmission based on a determination by the UE of a coverage enhancement (CE) level. For example, a CE level can be 0 dB (no CE) or larger than 0 dB. Multiple CE levels larger than 0 dB can be supported by an eNB, such as 5 dB or 10 dB. The narrow-band of RA preamble transmission that is associated with each CE level can be informed to the UE by a SIB. Based on a narrow-band where an eNB detects a RA preamble transmission, the eNB can determine the CE level the UE can assume for subsequent RAR reception.

When a CE level is 0 dB, a TPC command can be maintained at 3 bits and can be mapped to transmission power adjustments of a PUSCH conveying a respective Msg3 as in Table 6.2-1 of REF 3, or can be reduced for example to 2 bits and can be mapped to transmission power adjustments of a PUSCH conveying a respective Msg3 as in Table 6.2-1 of REF 3 by skipping every other value and starting from the first value of from the second value.

When a CE level is larger than 0 dB, a UE can transmit Msg3 with maximum power and the TPC command IE can be removed.

UL delay IE: The 1-bit UL delay IE can be either re-interpreted or removed.

In a first approach, the 1-bit UL delay IE is maintained in an individual compact RAR message and its meaning is relative to a number of SFs where a UE transmits a PUSCH conveying a respective Msg3. For example, when the number of SFs is one, the interpretation of the 1-bit UL delay IE is that the PUSCH is transmitted in SF n+6 when the UL delay IE has a binary value of 0 or in SF n+7 when the UL delay IE has a binary value of 1, where n is the last SF (when more than one) of the PDSCH reception that conveys the RAR. When the number of SFs where a UE transmits a PUSCH conveying a respective Msg3 is $R_3>1$, the interpretation of the 1-bit UL delay IE is that the first SF where the UE transmits the PUSCH is SF n+6 when the UL delay IE has a binary value of 0 or is SF $n+6+R_3$ when the UL delay IE has a binary value of 1, where n is the last SF (when more than one) of a PDSCH transmission that conveys a respective RAR. Alternatively, the UL delay IE is maintained when the UE transmits Msg3 without repetitions (transmission is in only one SF) and the UL delay IE is removed when the UE transmits Msg3 with repetitions (transmission is in multiple SFs) and the first SF where the UE transmits the PUSCH is SF n+6.

In a second approach, the 1-bit UL delay IE is removed and the first SF (when more than one) where a UE transmits a PUSCH conveying a respective Msg3 is SF n+6 where n is the last SF (when more than one) of a PDSCH transmission that conveys a respective RAR.

CSI-request IE: The 1-bit CSI request is either maintained or removed.

In a first approach, the 1-bit CSI-request is removed.

In a second approach, the 1-bit CSI-request is maintained when a UE operates with normal coverage (or with a small coverage enhancement), as determined by an eNB from a narrow-band of 6 successive RBs the UE use for an associated RA preamble transmission, and the CSI-request is removed when the UE operates in enhanced coverage.

Figure 9:
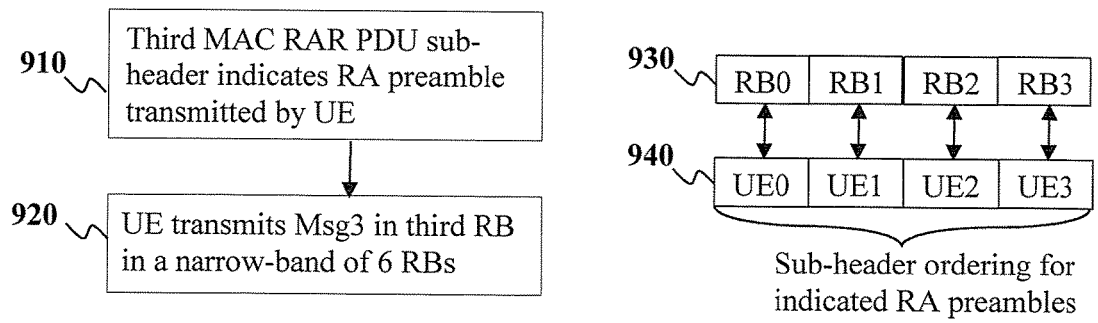
FIG. 9 illustrates a determination by a UE of a RB for Msg3 transmission according to the fifth approach according to this disclosure.

FIG. 9 illustrates a determination by a UE of a RB for Msg3 transmission according to the fifth approach according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station in one of UEs 111-116.

A UE detects a MAC RAR PDU and an associated RA preamble transmitted by the UE is indicated in the third sub-header of the MAC RAR PDU 910. In response to an identification of the transmitted RA preamble, the UE transmits a PUSCH conveying an Msg3 in a third RB with a narrow-band of 6 RBs 920. For example, for a MAC RAR PDU conveying four individual RAR messages 930, and for a narrow-band of 6 RBs (determined as described in one of the first four approaches), UE2 transmits a PUSCH conveying Msg3 in RB2 940.

Table 5 provides exemplary contents of an UL grant in a conventional RAR message for Msg3 transmission and exemplary contents of an UL grant in a compact RAR message for Msg3 transmission in normal coverage and in enhanced coverage.

TABLE 5

Contents of an UL grant for Msg3 transmission

| UL grant | Conventional UE | Normal Coverage UE | Coverage Enhanced UE |
|---|---|---|---|
| Hopping flag | 1 bit | 0 bit | 0 bit |
| RB Assignment | 10 bits | Depends on the approach | 0 bits |
| MCS | 4 bits | 0-4 bits | 0-3 bits |
| TPC command | 3 bits | 3 bits | 0 bits |
| UL delay | 1 bit | 0 or 1 bit | 0 bit |
| CSI-request | 1 bit | 0 or 1 bit | 0 bit |

For operation with enhanced coverage, an UL grant in a compact RAR message can also include an IE indicating a number of Msg3 repetitions as it is subsequently discussed for a design of a UE-specific DCI format scheduling a PUSCH transmission. The UL grant in the compact RAR message can also include $\lceil \log_2 N_{NB} \rceil$ bits or $\lceil \log_2(N_{NB}/2) \rceil$ bits to indicate one of the $N_{NB}$ narrow-bands in an UL system BW as described in the fourth approach.

An individual RAR message can be further reduced in size by reducing a size of its remaining components.

The 11-bit TA IE can be reduced, for example to 9 bits or less, at least for a UE in enhanced coverage operation (that is, for a UE transmitting a RA preamble or a Msg3 with repetitions) when a cell size for communication support of such a UE is reduced compared to a cell size for communication support of a UE in normal coverage operation. For example, a reduction in a cell size can be due to the existence of only a single receiver antenna for the UE or due to transmission/reception in a reduced BW for the UE or, in general, due to the UE experiencing a large propagation loss. For example, a cell radius can be reduced from 100 kilometers to 25 kilometers.

A UE can also determine that an eNB does not support a cell size above a certain size based on a RA preamble format the eNB indicates through a SIB. For example, RA preamble formats 0, 1, 2, and 3 are respectively associated with maximum cell sizes of ~14 Km, ~77 Km, ~29 Km, and ~100 Km. Therefore, when RA preamble format 0 or 2 is used, the TA size can be limited to 8 bits or 9 bits, respectively, and a UE can assume that the last 3 bits or 2 bits in a TA field of 11 bits have a value of 0. The UE can use assumed values of the TA field in improving or validating a decoding for a RAR. In practice, when an eNB supports coverage enhanced communication, a respective cell size is typically small and, for example, for a cell size of 0.6 Km, the TA field can be limited to include 3 bits. A SIB can indicate a number of TA bits and, in this manner, an eNB can adjust the number of TA bits according to a respective cell size.

The 16-bit TC-RNTI IE can be reduced, for example to 8 bits. This can be feasible when a UE only needs to decode few PDCCH candidates in order to detect a DCI format scheduling a respective Msg4 transmission. In such case, a probability that the UE incorrectly determines that the UE detected such a DCI format can remain sufficiently small. Scrambling of Msg3 transmission can be according to the reduced TC-RNTI. When Msg4 is not scheduled by a DCI format but is instead transmitted by the UE with predetermined parameters and in a predetermined first SF, the TC-RNTI can be removed.

Alternatively, a TC-RNTI can be removed from a RAR message as a TC-RNTI is not needed for non-contention based RA while, for contention based RA, TC-RNTIs can be associated through a one-to-one mapping with RA preambles, either by specification or by a mapping provided by a SIB. Therefore, an explicit indication of a TC-RNTI in a RAR message can be avoided and a UE can determine a TC-RNTI based on a RA preamble the UE transmitted.

A PDCCH can convey a DCI format scheduling a PDSCH transmission that conveys one or more RAR messages to respective one or more UEs. Alternatively, in order to reduce a total overhead associated with a RAR message transmission, a PDCCH can itself convey a RAR message to a single UE without scheduling an associated PDSCH; in this manner, the PDCCH conveys a RAR message instead of conveying a DCI format scheduling a RAR message. When a size of a DCI format scheduling the one or more RAR messages is different than the size of a DCI format conveying a single RAR message, respective PDCCHs need to be transmitted with different number of repetitions in order to achieve same detection reliability. Nevertheless, in order to minimize a signaling overhead in a SIB, a mapping between a number of repetitions for a RA preamble transmission and a number of repetitions for an associated PDCCH transmission can be provided, for example, for the case that the PDCCH conveys a DCI format scheduling a PDSCH transmission conveying RAR messages. Then, a number of repetitions for a PDCCH transmission conveying a single RAR message can be determined by scaling a number of repetitions for a PDCCH transmission conveying a DCI format scheduling a PDSCH transmission where a scaling factor can be either predetermined based on a ratio of a single RAR message size and the DCI format size or can be signaled in a SIB.

In another approach, a PDSCH conveying a MAC RAR PDU can be transmitted with predetermined parameters starting from a predetermined SF (when the PDSCH is transmitted in more than one SFs) instead of the transmission being scheduled by a DCI format. Then, a UE needs to be provided with other means to determine the TBS of the MAC RAR PDU. For example, a SIB can indicate a TBS that can correspond to a maximum MAC RAR PDU size. When a size of an actual MAC RAR PDU is smaller than the maximum one, padding bits can be included to provide a same size as the maximum one. As a number of repetitions required for a transmission of a PDSCH conveying a MAC RAR PDU can depend on an associated CE level, a SIB can indicate different maximum MAC RAR PDU sizes for different CE levels. For example, for a smaller CE level, a larger maximum MAC RAR PDU size can be indicated.

Figure 10:
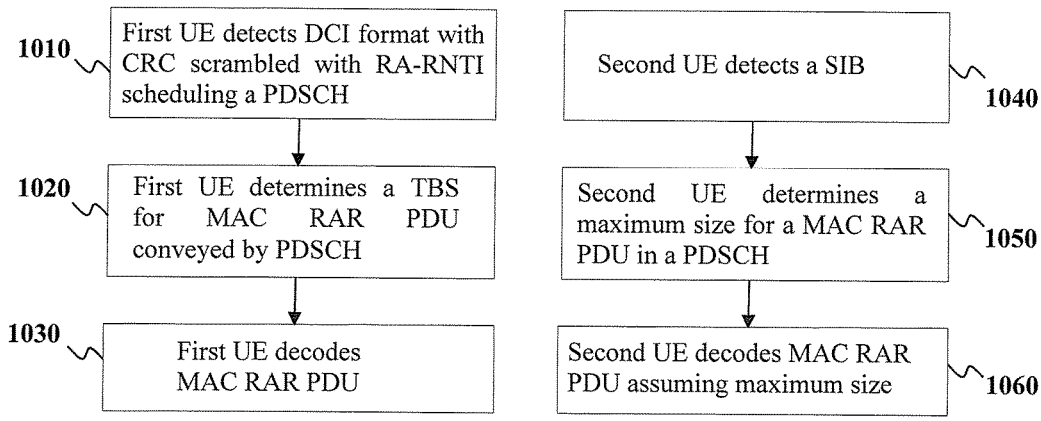
FIG. 10 illustrates a determination by a first UE and by a second UE of a respective TBS for a MAC RAR PDU according to this disclosure.

FIG. 10 illustrates a determination by a first UE and by a second UE of a respective TBS for a MAC RAR PDU according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station in one of UEs 111-116.

A first UE, such as a conventional UE, detects a DCI format after de-masking a CRC of the DCI format with a RA-RNTI 1010. The DCI format includes IEs providing a RB assignment and a MCS. Based on this information, the first UE determines a TBS for the MAC RAR PDU conveyed in a PDSCH scheduled by the DCI format 1020. Based on the determined TBS, the first UE decodes the MAC RAR PDU 1030. A second UE, such a UE in enhanced coverage, detects a SIB 1040. The SIB includes an IE indicating a maximum size for a MAC RAR PDU 1050. The SIB can separately indicate a maximum size for a MAC RAR PDU for each CE level supported by an eNB. Based on the indicated maximum size for the MAC RAR PDU (for a respective CE level when a different maximum size MAC RAR PDU is associated with a different CE level), the second UE can decode a MAC RAR PDU 1060. The MAC RAR PDU is conveyed by a PDSCH transmitted with predetermined parameters that are either specified in the system operation, such as for example PDSCH transmission over a number of 6 RBs and with QPSK modulation, or indicated in a SIB.

When a maximum size for a MAC RAR PDU can provide RAR messages for a first number of RA preambles and an eNB, such as one of eNBs 101-103, detects a second number of RA preambles that is larger than the first number, the eNB selects a first number from the second number of RA preambles to provide a respective RAR message in the PDSCH conveying the MAC RAR PDU. The eNB can provide a RAR message for each of the remaining number of RA preambles from the second number of RA preambles in one or more other MAC RAR PDUs that the eNB transmits in respective one or more PDSCHs within a RAR window with size RAR-WindowSize. When a MAC RAR PDU is not scheduled by PDCCH and an eNB transmits a PDSCH conveying the MAC RAR PDU with $R_2$ repetitions, the RAR-WindowSize can be defined as an integer multiple of $R_2$ SFs starting from a SF that is 3 SFs later from the last SF of a respective RA preamble transmission. When a MAC RAR PDU is scheduled by a PDCCH, the value of $R_2$ can include a sum for a value of PDCCH repetitions and a value of PDSCH repetitions. As an actual number of repetitions for a PDCCH transmission or for a PDSCH transmission can vary, for example depending on a respective transmission power from the eNB or on a size of the MAC RAR PDU, the value of $R_2$ can be a reference one and can be signaled in a SIB. The signaling can be for each respective CE level. Alternatively, the signaling of $R_2$ can be for one CE level and derived by a UE for other CE levels based on a relative dB difference between CE levels. For example, when $R_2=10$ for a first CE level and a second CE level is larger than the first CE level by 6 dB, a UE can derive the value of $R_2$ for the second CE level as $10^{(6/10)}$ times 10, or approximately 40.

Figure 11A:
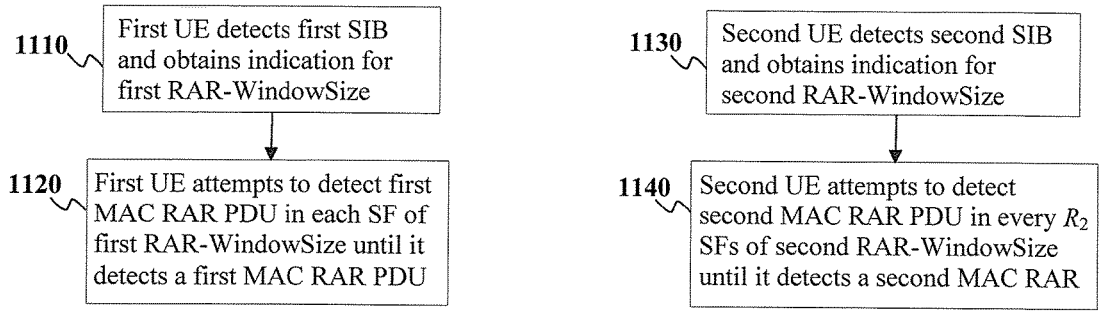
FIGS. 11A and 11B illustrate an operation by a first UE operating in a non-CE mode to detect a first MAC RAR PDU within a first RAR-WindowSize and by a second UE operating in a CE mode to detect a second MAC RAR PDU within a second RAR-WindowSize according to this disclosure.
Figure 11B:
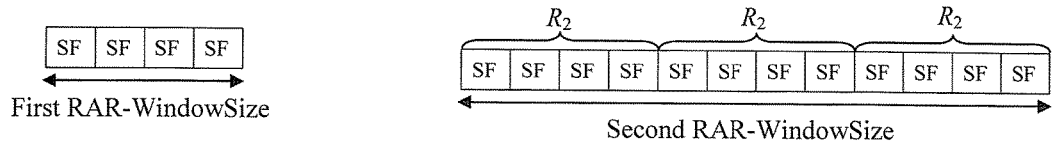

FIGS. 11A and 11B illustrate an operation by a first UE operating in a non-CE mode to detect a first MAC RAR PDU within a first RAR-WindowSize and by a second UE operating in a CE mode to detect a second MAC RAR PDU within a second RAR-WindowSize according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station in one of UEs 111-116.

A first UE operating in a non-CE mode detects a first SIB and obtains an indication for a first RAR-WindowSize 1110. The first UE attempts to detect a first MAC RAR PDU in each SF of the first RAR-WindowSize until the first UE detects a first MAC RAR PDU 1120 or until the end of the first RAR-WindowSize. For example, the first RAR-WindowSize can start 3 SFs after a SF where the first UE transmits a RA preamble. When the first UE does not detect a first MAC RAR PDU within the first RAR-WindowSize, the first UE retransmits the RA preamble, for example 3 SFs after the end of the first RAR-WindowSize. A second UE operating in a CE mode requiring a reference number of $R_2$ repetitions for a PDSCH (or for PDCCH and PDSCH) transmission conveying a second MAC RAR PDU, detects a second SIB and obtains an indication for a second RAR-WindowSize 1130. The second UE attempts to detect a MAC RAR PDU in every $R_2$ SFs of the second RAR-WindowSize until the second UE detects a second MAC RAR PDU 1140. The second RAR-WindowSize can be indicated by the second SIB. For example, the second RAR-WindowSize can start 3 SFs after a last SF where the second UE transmits a RA preamble. When the second UE does not detect a second MAC RAR PDU within the second RAR-WindowSize, the second UE retransmits a RA preamble, for example 3 SFs after the end of the second RAR-WindowSize.

A second embodiment of the disclosure considers UE-group scheduling/activation of PDSCH transmissions to UEs or PUSCH transmissions from UEs in order to reduce a control signaling overhead associated with UE-specific scheduling particularly when a message size in a PDSCH or a PUSCH can be small and the control signaling can require comparable resources to the message signaling.

With UE-group scheduling/activation, parameters associated with a PDSCH transmission to a UE or a PUSCH transmission from a UE can be configured to the UE by an eNB through higher layer signaling such as RRC signaling. A UE can support both UE-group scheduling and UE-specific scheduling. The functionalities of several IEs included in a conventional DCI format for UE-specific PDSCH or PUSCH scheduling can be removed. UE-group scheduling is similar to conventional SPS activation. One important difference is that UE-group scheduling is applicable to a group of UEs that are configured a common respective RNTI instead of an individual UE having a configured UE-specific SPS-RNTI.

In particular, the following can apply for IEs in a DCI Format 1A (see also REF 2) scheduling a PDSCH in case the PDSCH transmission is triggered by UE-group scheduling:

MCS IE: The MCS can be configured to a UE by an eNB using higher layer signaling such as RRC signaling.

RB assignment IE: The RB assignment can be configured to a UE by an eNB using higher layer signaling such as RRC signaling. For coverage enhanced UEs, it can be default that all 6 RBs are used for a PDSCH transmission and higher layer signaling can be avoided.

TPC command IE: The TPC command can be provided by other means, such as by a DCI Format 3/3A (see also REF 2), or its functionality can be unnecessary. For example, a coverage enhanced UE can always transmit HARQ-ACK in a PUCCH with maximum power.

SRS-request: The functionality of the SRS-request can be removed (A-SRS transmission need not be supported) at least for coverage enhanced UEs.

Localized/Distributed VRB assignment flag IE: The Localized/Distributed VRB assignment flag can be removed. This is because PDSCH transmission is over a maximum of 6 RBs and there is little difference of whether the transmission is localized or distributed. For example, distributed transmission can be default operation or the use of distributed or localized transmission can be configured in advance by a SIB. Further, for coverage enhanced UEs, a PDSCH transmission can be over 6 RBs by default in the system operation and then a differentiation between distributed and localized transmission is not applicable. A PDSCH transmission can be with repetitions that can use FH according to a predetermined pattern where use of FH can be indicated by a SIB.

HARQ-ACK resource offset indication IE: This functionality can be removed. For example, a PUCCH resource for HARQ-ACK transmission from a UE can be configured by RRC signaling or be determined without using a HARQ-ACK resource offset.

Downlink Assignment Index (DAI) IE: The DAI can be removed and scheduling of a same data TB can be assumed to be in only one SF in a set of DL SFs or, in general, in a higher layer configured number of SFs in the set of DL SFs for which a UE transmits HARQ-ACK in a same UL SF.

RV IE: The RV can be removed and one of the following alternatives can apply:
   Chase combining (instead of incremental redundancy) can be default especially when the message sizes conveyed to UEs are small.
   UE can assume correct reception by the eNB of the HARQ-ACK transmission by the UE and then the UE can derive the RV.
   Retransmission of a data TB can be with a UE-specific DCI format having a CRC scrambled with a C-RNTI.

HARQ process number IE: The HARQ process number can be determined similar to SPS PDSCH (see also REF 3 and REF 5), as HARQ process number=(floor((SFN*10)+SF_number)/GroupSchedIntervalDL)modulo(numberofHARQProcesses)

where SFN is a current system frame number, SF_number is a SF number in a current frame, GroupSchedIntervalDL is the interval (in number of SFs) between PDSCH transmissions, and numberofHARQProcesses is a number of HARQ processes for a UE and it can be specified in the system operation or be configured by higher layer signaling. For PDSCH transmissions with $R_{PDCCH}$ repetitions, SF_number can be replaced by the multiple of SF_number×$R_{PDCCH}$. Alternatively, synchronous HARQ can apply for PDSCH transmissions and then a HARQ process number is not needed.

NDI IE: In a first approach, the NDI can be removed and a UE can either assume correct reception by the eNB of the HARQ-ACK transmission by the UE or a retransmission of a data TB can be scheduled by a UE-specific DCI format with a CRC scrambled by a C-RNTI. In a second approach, the NDI is included in the DCI format for UE-group scheduling.

In particular, the following can apply for IEs conveyed by a DCI Format 0 (see also REF 2) scheduling a PUSCH in case the PUSCH transmission is instead triggered by UE-group scheduling:

FH flag IE: The FH flag can be removed. This is because a PUSCH transmission is over a maximum of 6 RBs and there is little difference of whether the transmission is localized or distributed. For example, distributed transmission can be default or the use of distributed or localized transmission can be configured by a SIB. Repetitions of a PDSCH transmission can use FH according to a predetermined pattern and whether or not FH is used can be indicated by a SIB.

RB assignment and hopping resource allocation IE: The respective information can be configured to a UE from an eNB by higher layer signaling.

MCS and RV IE: The MCS can be configured in advance by higher layer signaling such as RRC signaling. The RV can be removed and one of the following alternatives can apply:
   Chase combining (instead of incremental redundancy) can be default especially when the message sizes conveyed to UEs are small.
   UE can assume correct reception of HARQ-ACK information transmitted from the eNB and derive the RV.
   Retransmission of a data TB can be with a UE-specific DCI format having a CRC scrambled with a C-RNTI.

NDI IE: In a first approach, the NDI can be removed and the UE can either assume correct reception of the HARQ-ACK transmission by the eNB or a retransmission of a data TB can be scheduled by a UE-specific DCI format with a CRC scrambled by a C-RNTI. In a second approach, the NDI is included in the DCI format for UE-group scheduling.

TPC command IF: The TPC command can be provided by other means, such as a DCI Format 3/3A (see also REF 2), or be removed. For a coverage enhanced UE, a TPC command is not needed and PUSCH can be transmitted with maximum power.

Cyclic shift for DM RS and OCC index IE: Can be configured by higher layer signaling or a default value of 0 can apply (implying use of cyclic shift 0 (effectively, no cyclic shift) and OCC {1, 1} (effectively, no OCC)).

UL index IE: The functionality of the UL index can be removed and, for UL/DL configuration 0, a PUSCH transmission can start (and end in case of a single repetition) only in one of two possible SFs that can be configured to a UE by an eNB through higher layer signaling. For PUSCH transmissions using repetitions, the first repetition can be in the first of the two SFs by default.

DAI IE: The DAI can be removed and an eNB schedules at most one PDSCH transmission to a UE in one or more of a number of DL SFs that have HARQ-ACK transmissions from the UE, in response to respective PDSCH reception, in a same UL SF.

CSI request IE: The functionality of the CSI request can be removed. A UE does not need to include CSI in a PUSCH transmission in case of UE-group scheduling.

SRS request IE: The functionality of the SRS request IE can be removed. A UE need not support A-SRS transmission in case of UE-group scheduling.

Resource allocation type IE: The functionality of this IE can be removed.

A DCI format providing UE-group scheduling/activation can have a same size for activation of PDSCH transmissions to UEs and for activation of PUSCH transmissions from UEs in order to avoid increasing an associated number of PDCCH decoding operations that a UE needs to perform. To differentiate between UE-group scheduling for PDSCH transmissions and UE-group scheduling for PUSCH transmissions, the DCI format with CRC scrambled with GC-RNTI can also include a 1-bit flag where, for example, a binary '0' value indicates UE-group scheduling for PDSCH and a binary '1' value indicates UE-group scheduling for PUSCH. Alternatively, a UE can be configured with two GC-RNTIs, a first used for PDSCH scheduling and a second used for PUSCH scheduling.

A DCI format providing UE-group scheduling/activation can indicate scheduling/activation to all UEs configured with a respective GC-RNTI or only to a subset of them. In the latter case, the DCI format also includes a bit-map equal to the number of the UEs configured to detect the DCI format with CRC scrambled with the GC-RNTI in a given SF. For example, a bit-map value of binary '0' can indicate no activation of a PDSCH transmission to or a PUSCH transmission from a UE and a bit-map value of binary '1' can indicate such activation. A UE is configured by an eNB through RRC signaling a position in the bit-map for determining a respective bit-map value and determining activation of a PDSCH or PUSCH transmission.

The GC-RNTI can have a larger size than a conventional C-RNTI or a conventional SPS-RNTI that have a 16-bit size. A GC-RNTI with larger size than 16-bits can reduce a probability that a UE incorrectly detects a presumed DCI format having a CRC scrambled with a GC-RNTI. For example, a GC-RNTI can have a 24-bit size. Alternatively, the GC-RNTI can have a 16-bit size and a respective DCI format can include additional bits having predetermined values in order for a UE to perform additional validation of a DCI format it considers as detected based on a positive check of a CRC scrambled with a GC-RNTI.

Two approaches are considered for an eNB to provide HARQ-ACK information to UEs in response to UE-group activation of PUSCH transmissions from the UEs. The two approaches can also apply for UE-specific dynamic scheduling and for SPS.

In a first approach, HARQ-ACK information can be provided by a DCI format having a size equal to a number of UEs configured by the eNB to detect a DCI format with CRC scrambled with a GC-RNTI for activation of PUSCH transmissions. A UE is configured a position in the DCI format conveying HARQ-ACK information in order for the UE to obtain a respective HARQ-ACK information bit for its PUSCH transmission, if any. The position can be same as a respective position in a bit-map in the DCI format for scheduling/activation of PUSCH transmissions and separate configuration in then not needed. The UE is also configured with a HARQ-ACK-RNTI that eNB uses to scramble the CRC bits of the DCI format that conveys the HARQ-ACK information.

In a second approach, HARQ-ACK information to UEs is provided by a codeword that is transmitted through a PDCCH similar to a DCI format. The PDCCH can additionally have a fixed position (is transmitted using predetermined CCEs in a SF determined by the HARQ RTT). With the second approach, the codeword does not need to include a HARQ-ACK-RNTI. However, the HARQ-ACK codeword can include a CRC in order for a UE to determine whether it correctly detected the HARQ-ACK codeword.

Figure 12A:
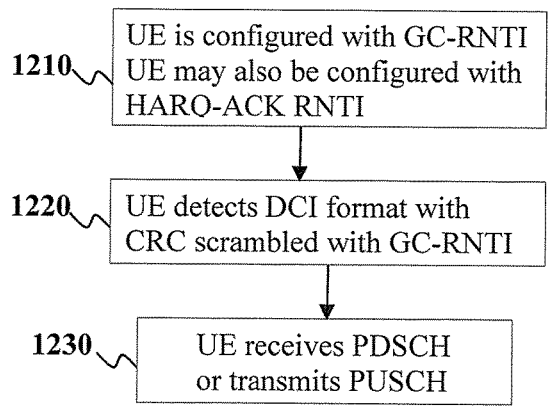
FIGS. 12A and 12B illustrate a UE-group scheduling/activation for PDSCH transmissions to or PUSCH transmissions from UEs according to this disclosure.
Figure 12B:
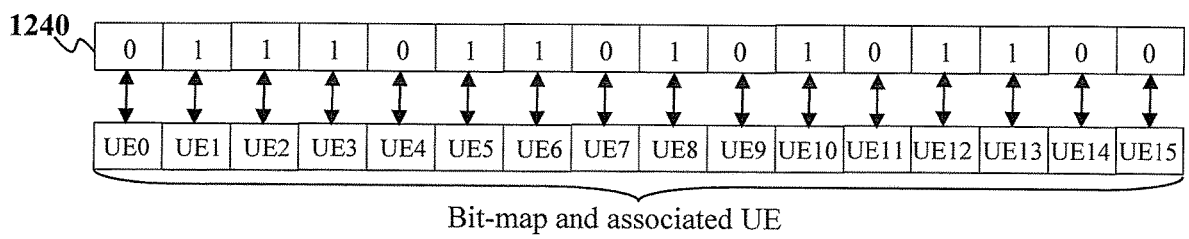

FIGS. 12A and 12B illustrate a UE-group scheduling/activation for PDSCH transmissions to or PUSCH transmissions from UEs according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a base station in one of BSs 101-103.

A UE, such as UE 114, is configured with GC-RNTI and, depending on whether the first approach or the second approach is followed for HARQ-ACK transmissions, the UE can also be configured with a HARQ-ACK-RNTI 1210. The UE detects a DCI format with CRC scrambled with GC-RNTI and determines whether the UE is activated a PDSCH reception or a PUSCH transmission 1220. Subsequently, the UE receives the PDSCH or transmits the PUSCH 1230. The UE can also be configured with a position in a bit-map 1240 for PDSCH or PUSCH activation or for HARQ-ACK reception. For example, the UE can be configured a seventh position in a 16-bit bit-map. For a DCI format activating a PDSCH or PUSCH transmission a value of '1' can indicate a respective transmission while for a DCI format providing HARQ-ACK information, a value of '1' can indicate a NACK.

A third embodiment of the disclosure considers UE-specific scheduling for PDSCH or PUSCH transmissions using compact DCI formats. The compact DCI formats have reduced size compared to conventional DCI formats in order to improve coverage and spectral efficiency in a communication system. A capability for UE-group activation for PDSCH or PUSCH transmissions, at least for initial transmission of data TBs, can be in addition to UE-specific scheduling.

A first (compact) DCI format can be designed for PUSCH scheduling and a second (compact) DCI format can be designed for PDSCH scheduling. The first and second DCI formats can be different between normal coverage operation and for enhanced coverage operation. The first and second DCI formats can be designed to have a same size, in order to reduce a number of PDCCH decoding operations a UE needs to perform and, in that case, the DCI formats can also include a 1-bit differentiation flag. Alternatively, the 1-bit differentiation flag can be avoided by associating the first and second compact DCI formats with respective first and second C-RNTIs.

For normal coverage operation, the first DCI format for PUSCH scheduling can include the following IEs (any IE in a conventional DCI format that is not listed below either does not need to be included in the first compact DCI format or remains same as for the conventional DCI format 0):

RB assignment and hopping resource allocation IE: It can include $\lceil \log_2(N_{RB}^{UL} \cdot (N_{RB}^{UL}+1)/2) \rceil = 5$ bits ($N_{RB}^{UL}=6$) and its functionality can be as for a conventional DCI format 0.

MCS and RV IE: The following design alternatives can apply:
The MCS and RV IE include 5 bits and its functionality is same as for a conventional DCI format 0. The last 11 entries in Table 3 can be considered as invalid by a UE when QAM64 modulation is not supported.
When QAM64 modulation is not supported, the MCS and RV IE can include 4 bits that can be mapped to a subset of 16 indexes from the first 21 MCS indexes in Table 3. When IR is supported for HARQ retransmissions, 8 of the first 21 MCS indexes in Table 3 are not supported (the first 13 are used to indicate MCS for RV0 and the last 3 are used to indicate a RV different than RV0 for a respective retransmission). When CC is supported for HARQ retransmissions, five of the first 21 entries from Table 3 are not supported (all 16 remaining indexes indicate an MCS). For example, MCS index 10 is not supported.
When both QAM64 modulation and QAM16 modulation are not supported, the MCS and RV IE can include 4 bits that can be mapped to all MCS indexes associated with QPSK modulation.

NDI IE: The NDI can include 1 bit and its functionality is same as for a conventional DCI format 0.

TPC command IE: The TPC command IE can include 2 bits and its functionality is same as for a conventional DCI format 0.

CS and OCC IE: The CS and OCC IE can be removed or reduced in size, for example to 1 bit or 2 bits, as a UE capable of receiving only within a BW of 6 RBs cannot receive an existing PHICH and there is little usefulness for spatial multiplexing a PUSCH transmission from the UE with PUSCH transmissions from other UEs.

For normal coverage operation, a second (compact) DCI format for PDSCH scheduling can include the following IEs (any IE in a conventional DCI format 1A that is not listed below either does not need to be included in the second compact DCI format or can be same as for the conventional DCI format 1A):

MCS IE: The following design alternatives can apply:
The MCS and RV IE include 5 bits and its functionality is same as for a conventional DCI format 1A. The last 11 entries in Table 4 can be considered as invalid by a UE when QAM64 modulation is not supported.
The MCS IE includes 3 bits and the mapping can be same as for the first 10 MCS indexes in Table 4 with 2 MCS indexes, such as $I_{MCS}=1$ and $I_{MCS}=3$, not being supported. Alternatively, the MCS IE includes 4 bits and supports at most the first 16 indexes in Table 4 (or the first 10 MCS indexes when only QPSK modulation is supported).

RB assignment IE: For type 2 resource allocation and PDSCH transmissions within $N_{RB}^{DL}=6$ RBs, $\lceil \log_2(N_{RB}^{DL} \cdot (N_{RB}^{DL}+1)/2) \rceil = 5$ bits are needed. Accounting for a worse reception reliability for a UE in coverage enhanced operation compared to a UE in normal coverage, for example due to an existence of only a single receiver antenna, a resource allocation granularity for PDSCH transmissions can be 2 RBs. Then, an effective transmission BW is $N_{RB\_eff}^{DL}=3$ pairs of RBs and $\lceil \log_2(N_{RB\_eff}^{DL} \cdot (N_{RB\_eff}^{DL}+1)/2) \rceil = 3$ bits are needed for the RB assignment IE.

TPC command IE: The TPC command can include 2 bits and its functionality can be same as for a conventional DCI format 1A.

RV IE: The RV can either be removed when chase combining is used or the RV can include 2 bits and have same functionality as for a conventional DCI format 1A.

HARQ process number IE: It can include 2 bits to support up to 4 HARQ processes (this is always sufficient for a half-duplex UE with a single oscillator requiring one SF switching time between DL receptions and UL transmissions or between DL transmissions and DL receptions), 3 bits for full-duplex UEs, or 4 bits for TDD.

NDI IE: The NDI can include 1 bit and its functionality is same as for a conventional DCI format 1A.

The size of the first DCI format can be aligned with the size of the second DCI format by either adopting design options resulting to a same size or by including padding bits or additional functionalities. For example, for the second DCI format, the RB assignment can have a granularity larger than 1 RB such as 2 RBs or the HARQ-ACK resource offset can be eliminated, or both.

Table 6 provides an example comparison for the IEs of the first DCI format with the IEs for DCI Format 0.

TABLE 6

IEs of a First Compact DCI Format Scheduling PUSCH and of DCI Format 0

| IE | First DCI Format | DCI Format 0 |
|---|---|---|
| Differentiation Flag | 1 | 1 |
| RB assignment | 5 | 5 |
| FH Flag | 0 | 1 |
| MCS and RV | 5 | 5 |
| NDI | 1 | 1 |
| TPC Command | 2 | 2 |
| CS and OCC Index | 0 | 3 |
| $n_{DMRS}$ | | |
| CSI Request | 1 | 1 |
| SRS Request | 0 | 1 |
| DAI or UL index - for TDD | 0 (FDD) or 2 (TDD) | 0 (FDD) or 2 (TDD) |
| C-RNTI | 16 | 16 |
| Total | 31 (FDD) or 33 (TDD) | 36 (FDD) or 38 (TDD) |

Table 7 provides an example comparison for the IEs of the second DCI format with the IEs for DCI Format 1A.

TABLE 7

IEs of a Second Compact DCI Format Scheduling PUSCH and of DCI Format 1A

| IE | Second DCI Format | DCI Format 1A |
|---|---|---|
| Differentiation Flag | 1 | 1 |
| RB assignment | 5 (or 3) | 5 |
| Distributed/Localized Flag | 0 | 1 |
| MCS | 5 | 5 |
| NDI | 1 | 1 |
| RV | 2 | 2 |
| HARQ Process Number | 3 (FDD) or 4 (TDD) | 3 (FDD) or 4 (TDD) |
| TPC Command | 2 | 2 |
| SRS Request | 0 | 1 |

TABLE 7-continued

IEs of a Second Compact DCI Format Scheduling PUSCH and of DCI Format 1A

| IE | Second DCI Format | DCI Format 1A |
|---|---|---|
| DAI - for TDD | 0 (FDD) or 2 (TDD) | 0 (FDD) or 2 (TDD) |
| HARQ-ACK Resource Offset | 2 (or 0) | 2 |
| RNTI | 16 | 16 |
| Total (FDD) | 34 (FDD) or 37 (TDD) | 39 (FDD) or 42 (TDD) |

The first DCI format and the second DCI format can also include an IE indicating a narrow-band of 6 RBs among a predetermined set of narrow-bands in an UL system BW or in a DL system BW, respectively, when the narrow-band of 6 RBs is not configured to a UE by an eNB through higher layer signaling.

For enhanced coverage operation or for UEs with limited mobility, a third (compact) DCI format for PUSCH scheduling can be based on the first DCI format and can be simplified as follows (any IE in a conventional DCI format 0 that is not listed below does not need to be included in the fourth DCI format):

RB assignment and hopping resource allocation IE: When 1 RB allocation is used by default in a system operation for an enhanced coverage PUSCH transmission, a 3-bit IE is sufficient to address any RB in a narrow-band of $N_{RB}^{UL}=6$ RBs by enumeration. For example, a '000' value can indicate a first RB, a '001' value can indicate a second RB, and so on. Alternatively, this IE can be removed and the RB can be configured to a UE by an eNB through higher layer signaling such as RRC signaling. The two alternatives can also be combined where a RB can be configured to a UE by an eNB and a 1-bit IE or a 2-bit IE can indicate a RB relative to the configured RB. For example, a UE can be configured the third RB in a narrow-band of $N_{RB}^{UL}=6$ RBs and a 1-bit IE can indicate either the (configured) third RB or the fourth RB from the narrow-band of $N_{RB}^{UL}=6$ RBs.

MCS and RV IE: The following design alternatives can apply:

The MCS and RV IE includes 4 bits. The last 3 entries can be considered invalid by a UE when only QPSK modulation is supported (first 10 entries indicate MCS and next 3 entries indicate RV for retransmission in case IR is used).

The MCS and RV IE is removed and the MCS index is configured by higher layer signaling to a UE from an eNB. The RV determination can be based on the respective HARQ-ACK information.

NDI: The NDI IE can include 1 bit and its functionality can be same as for a conventional DCI format 0. Alternatively, the NDI IE can be removed and a UE can determine whether a PUSCH needs to convey a new data TB or a retransmission of a data TB based on HARQ-ACK information the UE receives from an eNB.

TPC command IE: The TPC command can be removed. For enhanced coverage PUSCH operation, a PUSCH transmission can be with maximum power. Otherwise, a transmission power can be adjusted by higher layer signaling, such as RRC signaling, as SINR variations are typically slow.

CS and OCC IE: The CS and OCC IE can be removed or reduced in size, for example to 1 bit or 2 bits, as a UE capable of receiving only within a BW of 6 RBs cannot receive an existing PHICH and there is little usefulness for spatial multiplexing a PUSCH transmission from the UE with PUSCH transmissions from other UEs.

A differentiation flag can be removed and the DCI formats with a same size can instead be differentiated through a different C-RNTI assignment.

For enhanced coverage operation or for UEs with limited mobility, a fourth (compact) DCI format for PDSCH scheduling can be based on the second DCI format that is further simplified as follows (any IE in a conventional DCI format 1A that is not listed below does not need to be included in the fourth DCI format):

MCS IE: The following design alternatives can apply:

The MCS IE includes 4 bits considering that only QPSK modulation is supported. The last 7 indexes from the first 16 indexes in Table 4 can be considered as invalid by a UE when QAM66 modulation and QAM16 modulation are not supported.

An MCS index, such as MCS index 0, can either be used by default in the system operation for a UE in enhanced coverage operation for a PDSCH transmission or the MCS index can be configured to the UE through RRC signaling by an eNB. This can be functional in practice as UEs operating with enhanced coverage typically have limited mobility and experience slow SINR variations.

RB assignment IE: The RB assignment IE can be removed. All $N_{RB}^{DL}=6$ RBs in a narrow-band can either be used by default in the system operation for PDSCH reception by a UE in enhanced coverage operation or the RB assignment can be configured to the UE by higher layer signaling from an eNB following a same rationale as for the MCS configuration.

TPC command IE: The TPC command IE can be removed. When coverage enhanced operation is needed for HARQ-ACK signaling on a PUCCH, the PUCCH transmission can be with maximum power. Otherwise, a transmission power can be adjusted by higher layer signaling, such as RRC signaling, as SINR variations are typically slow.

RV IE: The RV IE can be removed when RV cycling applies across repetitions of a PDSCH transmission or when chase combining is used.

HARQ process number IE: The IE can include 1 or 2 bits to support up to 2 or 4 HARQ processes, respectively (this is always sufficient for a half-duplex UE with a single oscillator requiring one SF switching time between DL receptions and UL transmissions and operating with PDSCH repetitions). Alternatively, the IE can be removed and one HARQ process can be default for a PDSCH transmission with repetitions (coverage enhanced operation).

NDI IE: The NDI IE can include 1 bit and its functionality can be same as for a conventional DCI format 1A. Alternatively, the NDI IE can be removed and a UE can determine whether a PDSCH conveys a new data TB or a retransmission of a data TB based on the HARQ-ACK information the UE transmitted to an eNB.

When the third DCI format and the fourth DCI format have a same size, they can either include a 1-bit flag for differentiation or an eNB can configure a UE with different respective C-RNTIs for the third DCI format and for the fourth DCI format. The third DCI format or the fourth DCI formats can also include a respective IE indicating a number of repetitions for a respective PUSCH transmission or PDSCH transmission or for an associated PDCCH transmission. Alternatively, these repetitions can be implicitly derived, for example by using different scrambling of the DCI format information bits, before or after encoding, or by using different C-RNTIs according to a repetition number. The third DCI format and the fourth DCI format can also include an IE indicating a narrow-band of 6 RBs among a predetermined set of narrow-bands in an UL system BW or in a DL system, respectively, when the narrow-band of 6 RBs is not configured to a UE by an eNB through higher layer signaling. For example, for indicating a narrow-band from a set of 8 or 16 narrow-bands, a 3-bit IE or a 4-bit IE can be respectively included in the DCI formats. When the size of one DCI format, such as the third DCI format, is larger than the size of the other format, such as the fourth DCI format, the range of some IEs in the third DCI format can be reduced. For example, instead of using 3 bits to enumerate an assigned RB within a set of 6 RBs, 2 bits can be used and an assigned RB can be indicated relative to a reference RB that is configured by higher layer signaling to a UE from the eNB, such as for example the first RB or the fourth RB in the set of 6 RBs. For example, instead of using 4 bits to represent the MCS and RV IE for the third DCI format, 3 bits can be used and 2 of the first 10 entries in Table 3 that are associated with QPSK modulation can be precluded.

Table 8 provides an exemplary comparison for IEs of the third DCI format with IEs of the first DCI format.

TABLE 8

IEs for a First and a Third Compact DCI Format Scheduling PUSCH

| IE | Third DCI Format | First DCI Format |
|---|---|---|
| Differentiation Flag | 1 | 1 |
| RB assignment | 3 | 5 |
| FH Flag | 0 | 0 |
| MCS and RV | 4 | 5 |
| NDI | 1 | 1 |
| TPC Command | 0 | 2 |
| CS and OCC Index $n_{DMRS}$ | 0 | 0 |
| CSI Request | 0 | 1 |
| SRS Request | 0 | 0 |
| DAI or UL index (TDD) | 0 | 2 |
| C-RNTI | 16 | 16 |
| Total | 25 | 31 (FDD) or 33 (TDD) |

Table 9 provides an exemplary comparison for IEs of the fourth DCI format with IEs of the second DCI format.

TABLE 9

IEs for a Second and a Fourth Compact DCI Format Scheduling PDSCH

| IE | Fourth DCI Format | Second DCI Format |
|---|---|---|
| Differentiation Flag | 1 | 1 |
| RB assignment | 0 | 5 |
| Distributed/Localized Flag | 0 | 0 |
| MCS | 4 | 5 |
| NDI | 1 | 1 |
| RV | 0 | 2 |
| HARQ Process Number | 0 | 3 (FDD) or 4 (TDD) |
| TPC Command | 0 | 2 |
| SRS Request | 0 | 0 |
| DAI - for TDD | 0 | 0 (FDD) or 2 (TDD) |
| HARQ-ACK Resource Offset | 0 | 2 |
| RNTI | 16 | 16 |
| Total (FDD) | 22 | 34 (FDD) or 37 (TDD) |

An eNB 102 can also configure a UE 114 with a SPS-RNTI, in addition to a C-RNTI, for the DCI formats scheduling a PDSCH transmission to or a PUSCH transmission from the UE 114. In that case, each IE that exists in a respective DCI format can be set to a predetermined value in order to serve as virtual CRC and reduce a probability for incorrect SPS activation or de-activation.

An eNB 102 can configure a UE 114 operating with small coverage enhancements, such as a 3-6 dB coverage enhancements, to decode DCI formats associated with PDSCH/PUSCH transmissions without repetitions (normal coverage) even when a respective PDCCH is transmitted with repetitions. This is because it is not necessary that the PUSCH or the PDSCH require repetitions as this can depend on a UE 114 power amplifier class or on an eNB 102 transmission power, or on a data TB size, and so on. Additionally, as a UE 114 can operate in normal coverage (for example, depending on link quality variations or power boosting of transmissions to the UE 114 by an eNB 102), some DCI format parameters (such HARQ process number) need to maintain their functionality as in normal coverage even when either of PDCCH, or PDSCH, or PUSCH is transmitted with repetitions. The eNB 102 can configure a UE 114 operating with larger coverage enhancements to decode the third DCI format and the fourth DCI format. Therefore, an eNB 102 can configure a UE 114 to monitor (decode) DCI formats corresponding to normal coverage operation, such as the first DCI format and the second DCI format, when the UE 114 can receive a PDCCH transmission or a PDSCH transmission with and without repetitions or when the UE 114 can transmit a PUSCH with or without repetitions or the eNB 102 can configure the UE 114 to monitor DCI formats corresponding to coverage enhanced operation, such as the third DCI format and the fourth DCI format. Alternatively, an eNB 102 can configure a UE 114 that receives a PDCCH transmission or a PDSCH transmission with repetitions or transmits a PUSCH with repetitions to monitor the first DCI format and the second DCI format that are also monitored by UEs operating in normal coverage (without requiring repetitions).

Further, for a RA preamble transmission, when a UE 114 reaches a number of configured attempts for a RA preamble transmission with no repetitions without detecting an associated RAR message then, based on an indication by an eNB 102 of RA preamble resources for RA preamble transmissions with $R_1$ repetitions corresponding to a lowest CE level after normal coverage, the UE 114 can continue applying power ramping for a RA preamble when the UE 114 operates at the lowest CE level and transmits the RA preamble with $R_1$ repetition by adjusting a power for a first RA preamble transmission with $R_1$ repetitions by $|10 \log_{10}(R_1)-\delta|$dB where $\delta$ is a power ramping step the eNB 102 configures to the UE 114 by higher layer signaling and $\|$.

A UE 114 can also be configured to monitor a PDCCH for a DCI format providing a TPC command in certain SFs in order to support link adaptation for SPS PUSCH or for P-CSI or HARQ-ACK on PUCCH in response to SPS PDSCH. The SFs can be configured or can be predetermined in the system operation. For example, when a PDCCH transmission without repetitions conveys the DCI format, the UE 114 can be configured to monitor the PDCCH for DCI format detection at a number of SFs, such as four SFs, prior to the SF for a SPS PUSCH transmission. Alternatively, the number of SFs can be predetermined to be four. The UE 114 can monitor the DCI format only in the configured or predetermined SFs. The narrow-bands of 6 RBs where the UE 114 monitors the PDCCH can also be configured by an eNB 102 and the configuration can be separate for the one for the narrow-bands where the UE 114 monitors PDCCH scheduling PDSCH transmission to or PUSCH transmission from the UE 114.

A same DCI format can also convey both TPC commands and HARQ-ACK information in response to PUSCH transmissions. For example, for a DCI format that includes 15 information bits, the first 10 information bits can convey TPC commands for 5 UEs (2-bit TPC command) and the last 5 information bits can convey HARQ-ACK information for 5 UEs (1-bit HARQ-ACK information). A first UE can be configured a first location for DCI format information bits to obtain a TPC command and a second location for DCI format information bits to obtain a HARQ-ACK information. For example, the first UE can be configured to obtain a TPC command from the fourth and fifth information bits of the DCI format and to obtain HARQ-ACK information from the sixth information bit of the DCI format. A second UE can be configured a third location for DCI format information bits to obtain a TPC command and a fourth location for DCI format information bits to obtain a HARQ-ACK information. For example, the second UE can be configured to obtain a TPC command from the seventh and eighth information bits of the DCI format and to obtain HARQ-ACK information from the ninth information bit of the DCI format. For example, the configuration can be by bit-map signaling where the bit-map can indicate a triplet of bits in the DCI format in case a TPC command is represented by 2 bits, HARQ-ACK information is represented by 1 bit, and all bits are consecutive in the DCI format, or by enumeration of the locations, and so on.

The mechanism to provide both TPC commands and HARQ-ACK information to one or more respective UEs using a same DCI format can be applicable in general and in particular to SPS PUSCH transmissions where a UE can obtain both HARQ-ACK information for a previous PUSCH transmission and a TPC command for a next PUSCH transmission by detecting a same DCI format.

Figure 13:
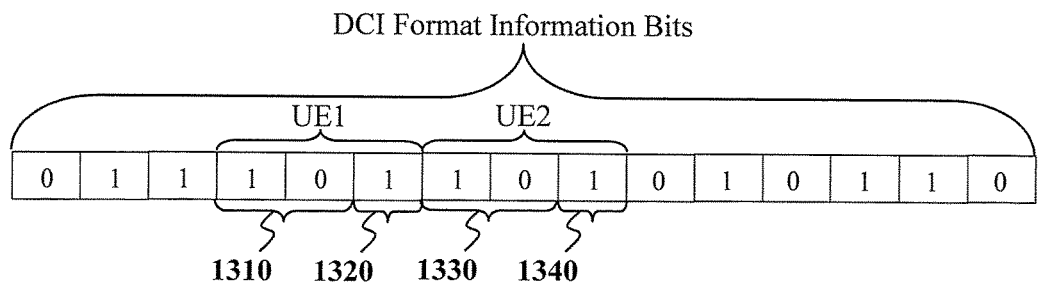
FIG. 13 illustrates a same DCI format providing TPC commands and HARQ-ACK information to a group of UE according to this disclosure.

FIG. 13 illustrates a same DCI format providing TPC commands and HARQ-ACK information to a group of UE according to this disclosure. The embodiment shown in FIG. 13 is for illustration only. Other embodiments could be used without departing from the scope of the present disclosure.

An eNB 102 configures to a first UE, such as UE 114, a first position in a DCI format for a TPC command 1310 and a second position in the DCI format for HARQ-ACK information 1320. A single configuration can apply when the position are consecutive. The TPC command is represented by 2 bits and the HARQ-ACK information is represented by 1 bit. The eNB 102 configures to a second UE, such as UE 116, a third position in the DCI format for a TPC command 1330 and a fourth position in the DCI format for HARQ-ACK information 1340. The eNB 102 transmits and the first UE or the second UE detects the DCI format and determines a TPC command to apply to a signal transmission and determines HARQ-ACK information in response to a data TB transmission from the first UE or from the second UE, respectively.

A fourth embodiment of the disclosure considers scheduling for HD-FDD UEs in order to achieve a target DL data rate or a target UL data rate and further considers means to increase a DL data rate or an UL data rate.

In the following, unless otherwise explicitly mentioned, a UL-to-DL switch time is assumed to be one SF and a DL-to-UL switch time is assumed to be one SF. Additionally, a DL DCI format can either schedule a PDSCH reception or an SPS release for the HD-FDD UE; however, for brevity, only the case of PDSCH reception is subsequently referred to.

Configurations of DL SFs and UL SFs in one or more frames are considered for a HD-FDD UE. Different configurations of DL SFs and UL SFs per frame can result to different design requirements, for example with respect to DCI format design or with respect to HARQ-ACK transmissions from an eNB to a HD-FDD UE or from a HD-FDD UE to an eNB 102 depending on a distribution and number of DL SFs and UL SFs per frame or per number of frames for a configuration. In the following, SF #0, SF #4, SF #5, and SF #9 are SFs where an eNB 102 can always transmit unicast DL information. Some or all of the remaining SFs can be configured as multicast broadcast single frequency network (MBSFN) SFs (see also REF 3).

Several indicative cases for configurations of DL SFs and UL SFs per frame are considered with respect to design requirements. However, the embodiment is not limited to the following configurations that have as a primary purpose to serve as reference for the different functionalities that need to be supported depending on a respective number and distribution of DL SFs and UL SFs per frame or pre number of frames.

Case 1: Maximum Number of UL SFs and Minimum Number of DL SFs Per Frame (UL-Dominant Traffic)

Considering that a HD-FDD UE requires 1 SF for UL-DL switching or DL-UL switching, SF #9, SF #1, SF #4, and SF #6 cannot be UL SFs. Therefore, a set of UL SFs in a frame that includes a maximum number of SFs that can be UL SFs is {SF #2, SF #3, SF #7, SF #8}. PDSCH and PUSCH scheduling and respective HARQ-ACK transmissions are subsequently considered for the configuration {D, X, U, U, X, D, X, U, U, X} where 'D' denotes a DL SF, U denotes an UL SF, and 'X' denotes a (DL-UL or UL-DL) switching SF. A PUSCH transmission in SF n+4 cannot be scheduled by an UL DCI format detection in SF n as {SF #2, SF #3, SF #7, SF #8} cannot be scheduled by an UL DCI format transmitted in {SF #8, SF #9, SF #3, SF #4}.

Figure 14:
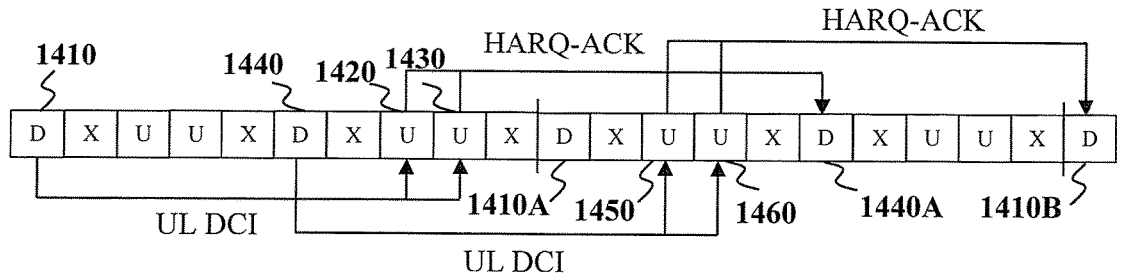
FIG. 14 illustrates a HARQ RTT for PUSCH transmissions from a HD-FDD UE for a configuration of SFs per frame according to Case 1 according to this disclosure.

FIG. 14 illustrates a HARQ RTT for PUSCH transmissions from a HD-FDD UE for a configuration of SFs per frame according to Case 1 according to this disclosure. The embodiment shown in FIG. 14 is for illustration only. Other embodiments could be used without departing from the scope of the present disclosure.

An UL DCI format transmitted by an eNB in SF #0 1410 can schedule a PUSCH transmission from the HD-FDD UE in either or both of SF #7 1420 and SF #8 1430. An UL DCI format transmitted by the eNB in SF #5 1440 can schedule a PUSCH transmission from the HD-FDD UE in either or both of SF #2 1450 and SF #3 1460. The eNB 102 can transmit acknowledgement information, when supported, in SF #5 740A in response to PUSCH reception in SF #7 1420 or in SF #8 1430 and transmit acknowledgement information in SF #0 1410 in response to a PUSCH reception in SF #2 1450 or in SF #3 1460. The acknowledgement information can be either explicit through a PHICH or implicit through the NDI IE in an UL DCI format. When transmission of acknowledgement information is not supported, the eNB can transmit an UL DCI format indicating transmission of a new data TB (equivalent to transmitting ACK) or a retransmission of a data TB (equivalent to transmitting NACK).

In order for an eNB 102 to schedule, using a same UL DCI format, one or more PUSCH transmissions from a HD-FDD UE in respective one or more UL SFs, an UL index IE needs to be included in a respective UL DCI format. In a first approach, one UL DCI format schedules one PUSCH transmission and this can be sufficient when a HD-FDD UE can be assumed to have small data packets to transmit. Then, the UL index IE can include one binary element that indicates PUSCH transmission in one of two possible UL SFs. For example, a binary value of '0' for the UL index IE in an UL DCI format transmitted in SF #5 can indicate a PUSCH transmission in the earlier of the two SFs, such as SF #2, and a binary value of '1' can indicate a PUSCH transmission in the later of the two UL SFs, such as SF #3. However, an inability to schedule all UL SFs for a HD-FDD UE limits an UL data rate that can be achieved for the HD-FDD UE.

Alternatively, to increase an UL data rate for a HD-FDD UE, the UL index IE can include two binary elements. For example, a binary value of '00' for the UL index IE in an UL DCI format transmitted in SF #5 can indicate a PUSCH transmission in the earlier of the two SFs, such as SF #2, a binary value of '01' can indicate a PUSCH transmission in the later of the two UL SFs, such as SF #3, a binary value of '10' can indicate PUSCH transmissions in both UL SFs, such as SF #2 and SF #3, and a binary value of '11' can remain reserved and not correspond to a valid UL DCI format. Therefore, when a HD-FDD UE, such as UE 114, is configured a SF configuration per frame with more UL SFs than DL SFs per frame, an UL DCI format for the HD-FDD UE can include an UL index IE of one or two binary elements. Additionally, the HARQ RTT is not 8 SFs as for a FD-FDD UE but instead it depends on the configuration of DL SFs and UL SFs. For the configuration in FIG. 14, the HARQ RTT is a multiple of 15 SFs (depending on a number of HARQ processes).

When a PUSCH retransmission is scheduled by an UL DCI format (NDI IE indicates PUSCH retransmission), instead of being triggered by a NACK value in a respective PHICH or PDCCH, the UL index IE can be used to indicate the PUSCH for retransmission by indicating the UL SF associated with the initial PUSCH transmission for a same data TB. Equivalently, when a value of the NDI IE in an UL DCI format is not toggled but the value of an UL index IE is different, the PUSCH HARQ process can be asynchronous. For example, when a HD-FDD UE detects an UL DCI format in SF #5 that indicates a PUSCH retransmission for an earlier SF (UL index IE value of '00'), the HD-FDD UE transmits in a PUSCH in SF #2 a same data TB as for an initial transmission in SF #7 two frames before the frame of SF #2.

When a PUSCH retransmission is triggered by a NACK value in a respective PHICH then, in order to uniquely associate a PHICH resource in a DL SF with an UL SF of a respective previous PUSCH transmission, in case of multiple UL SFs, different PHICH resources need to be assigned for PUSCH transmissions in different SFs. A HD-FDD UE can determine the PHICH resource as in Equation 1 but with an additional factor that assigns different PHICH resources to different SFs and $$n_{PHICH}^{group} = (I_{PRB\_RA} + n_{DMRS}) \bmod N_{PHICH}^{group} + I_{PHICH\_HD\text{-}FDD} N_{PHICH}^{group}$$

$$n_{PHICH}^{seq} = (\lfloor I_{PRB\_RA}/N_{PHICH}^{group}\rfloor + n_{DMRS}) \bmod 2N_{SF}^{PHICH}$$

(Equation 1)

where $I_{PHICH\_HD\text{-}FDD}=0$ for the earlier SF, such as SF #2 or SF #7, from a pair of SFs such as {SF #2, SF #3} or {SF #7, SF #8}, and SF #8, and $I_{PHICH\_HD\text{-}FDD}=1$ for the later SF, such as SF #3 or SF #8, from the pair of SFs such as {SF #2, SF #3} or {SF #7, SF #8}.

Alternatively, when a PDCCH conveys the HARQ-ACK information, as described in the third embodiment of the disclosure, a UE 114 can be configured multiple locations in the DCI format that are associated by a one-to-one mapping with the UL SFs where the UE (in normal coverage) can transmit a PUSCH.

Figure 15:
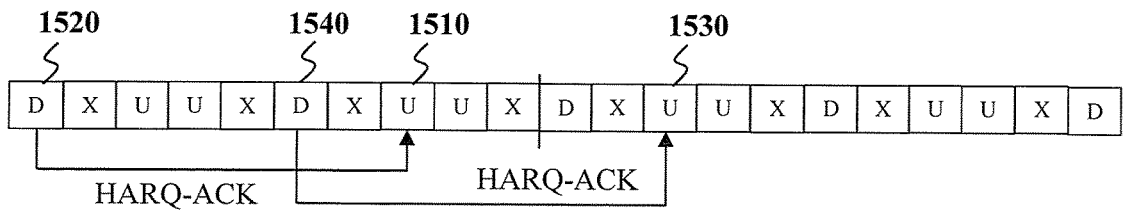
FIG. 15 illustrates a HARQ RTT for PDSCH transmissions to a HD-FDD UE for a configuration of SFs per frame according to Case 1 according to this disclosure.

FIG. 15 illustrates a HARQ RTT for PDSCH transmissions to a HD-FDD UE for a configuration of SFs per frame according to Case 1 according to this disclosure. The embodiment shown in FIG. 15 is for illustration only. Other embodiments could be used without departing from the scope of the present disclosure.

A HD-FDD UE, such as UE 114 when so configured, receives a PDSCH in a same SF as the SF where the HD-FDD UE detects a respective DL DCI format. The HD-FDD UE transmits HARQ-ACK in SF #7 1510 in response to DL DCI format detection in SF #0 1520 and transmits HARQ-ACK in SF #2 1530 in response to DL DCI format detection in SF #5 1540. Unlike a FD-FDD UE that transmits HARQ-ACK in SF n+4 in response to a PDSCH reception in SF n, a HD-FDD UE can transmit HARQ-ACK in SF n+k, k≥4, in response to a PDSCH reception in SF n.

When a HD-FDD UE operates with a SF configuration such as {D, X, U, U, X, D, X, U, U, X} as in FIG. 15, there are only two DL SFs per frame and a number of DL HARQ processes a HD-FDD UE needs to support is two. Therefore, a HARQ process number IE in a DL DCI format for a HD-FDD UE configured with a maximum number of four UL SFs per frame can include only one binary element. For example, a binary value of '0' can correspond to a first DL HARQ process and a binary value of '1' can correspond to a second DL HARQ process. Therefore, a HARQ process number IE that includes 3 bits for a FD-FDD UE, in order to support 8 DL HARQ processes, can include 1 binary element for a HD-FDD UE that is configured the SF configuration such as {D, X, U, U, X, D, X, U, U, X} or, when the HARQ process number IE includes 3 bits, the HD-FDD UE can determine that a detected DCI format is valid only when the redundant 2 bits, that can be the 2 most significant bits, are set to 0.

As a number of HARQ processes for a HD-FDD UE can change depending on a respective SF configuration, support for operation with a maximum number of 8 DL HARQ needs to be maintained in order to schedule the HD-FDD UE during an ambiguity period for RRC reconfigurations relating to a time an eNB 102 transmits RRC reconfiguration signaling and a time the HD-FDD UE begins operation with a new configuration. Therefore, in addition to always maintaining one or more SFs, such as SF #0 and SF #5, as DL SFs in all SF configurations (and maintaining one or more SFs, such as SF #2 and SF #7, as UL SFs in all SF configurations), a DCI format transmitted through a PDCCH in a common-search space can always maintain a default configuration and interpretation. For example, for the number of HARQ processes, a DL DCI format transmitted through a PDCCH in the common-search space can maintain a DL HARQ process IE that includes 3 bits to indicate one of eight DL HARQ processes.

Case 2: Maximum Number of DL SFs and Minimum Number of UL SFs Per Frame (DL-Dominant Traffic)

In addition to SF #0 and SF #5, SF #4 and SF #9 are DL SFs. A minimum number of UL SFs can be one. As one SF is needed for DL-UL switching and one SF is needed for UL-DL switching, the UL SF can only be one of SF #3 or SF #7. For simplicity, only the case of SF #7 as the UL SF is considered. The same principles apply in case the UL SF is SF #2 that can be configured as an UL SF to another HD-FDD UE.

Figure 16:
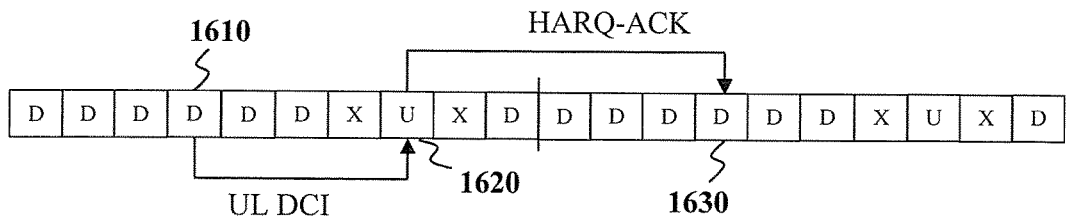
FIG. 16 illustrates a HARQ RTT for PUSCH transmission from a HD-FDD UE for a configuration with one UL SF per frame according to Case 2 according to this disclosure.

FIG. 16 illustrates a HARQ RTT for PUSCH transmission from a HD-FDD UE for a configuration with one UL SF per frame according to Case 2 according to this disclosure. The embodiment shown in FIG. 16 is for illustration only. Other embodiments could be used without departing from the scope of the present disclosure.

An eNB 102 can transmit in SF #3 1610 an UL DCI format scheduling a PUSCH transmission from HD-FDD UE in SF #7 1620. However, due to an existence of only one UL SF per frame, a conventional HARQ RTT, where the HD-FDD UE detects an UL DCI format in SF n, transmits a respective PUSCH in SF n+4 and the HD-FDD UE 114 receives HARQ-ACK information for a same HARQ process in SF n+8, cannot be maintained as the HARQ RTT is 8 SFs while the periodicity of UL SF #7 is 10 SFs. The HARQ RTT is then adjusted to be a multiple of 10 SFs (depending on a number of HARQ processes) and the HD-FDD UE receives either a PHICH or a DCI format conveying HARQ-ACK information or scheduling a retransmission of a data TB or a transmission of a new data TB in SF #3 1630. It can also be possible to schedule transmission in SF #7 1620 from any previous DL SF in a same frame or after DL SF #3 in a previous frame.

When a HD-FDD UE is configured a number of DL SFs that is larger than a number of UL SFs, the HD-FDD UE needs to transmit, in a same UL SF, HARQ-ACK information for PDSCH receptions in more than one DL SFs. For the case of a single UL SF per frame, and accounting for one DL-UL switching SF and one UL-DL switching SF per frame, the HD-FDD UE needs to transmit HARQ-ACK information for up to 7 PDSCH receptions. For example, the HD-FDD UE needs to transmit in SF #7 of a current frame, HARQ-ACK information that can include outcomes for PDSCH reception in SF #0, SF #1, SF #2, and SF #3 in the current frame and in SF #9, SF #5, and SF #4 in a previous frame.

A HD-FDD UE 114 can be limited to support only HARQ-ACK multiplexing or PUCCH Format 1a/1b and not support PUCCH Format 3 (see also REF 1 and REF 3). Then, in case of PUCCH Format 1b with HARQ-ACK multiplexing, the HD-FDD UE selects a PUCCH resource from a set of potentially more than one PUCCH resources (see also REF 3). One approach to enable use of PUCCH Format 1a/1b is for a HD-FDD UE to perform, when necessary, bundling of HARQ-ACK information corresponding to PDSCH receptions in multiple SFs. A DAI IE can be included in a DCI formats, similar to TDD operation, to enable a HD-FDD UE to determine whether the HD-FDD UE failed to detect any PDSCH transmission and to accordingly determine the HARQ-ACK information (the HD-FDD UE generates a NACK/DTX value for the HARQ-ACK information corresponding to a DL DCI format that the HD-FDD UE identifies as having failed to detect).

Another approach is to constrain configurations of DL SFs and UL SFs to the HD-FDD UE to not have more than four times the number of DL SFs relative to the number of UL SFs. The arrangement to be such that the HD-FDD UE does not need to transmit, in a same UL SF, HARQ-ACK information for PDSCH receptions in more than four DL SFs. Then, the HD-FDD UE can use PUCCH Format 1b with HARQ-ACK multiplexing to convey up to 4 HARQ-ACK information bits (see also REF 3).

An additional restriction can be that a configuration of DL SFs and UL SFs to a HD-FDD UE does not have more than twice a number of DL SFs relative to a number of UL SFs. The arrangement to be such that a HD-FDD UE does not need to transmit, in a same UL SF, HARQ-ACK information for more than two DL SFs. This allows use of PUCCH format 1b and operation without including a DAI IE in a DL DCI format scheduling a PDSCH to a HD-FDD UE due to the resource mapping as in Table 10.1.2.2.1-3 or Table 10.1.3-2 of REF 3. Further, a DAI can be omitted from an UL DCI format or a single bit DAI can be included to indicate whether or not an eNB transmitted a PDSCH in the SF of the two SFs where the UL DCI format scheduling a respective PUSCH was not transmitted. This is because when a DL DCI format is transmitted in a same DL SF as an UL DCI format, a HD-FDD UE is likely to either receive or miss both DCI formats.

Figure 17:
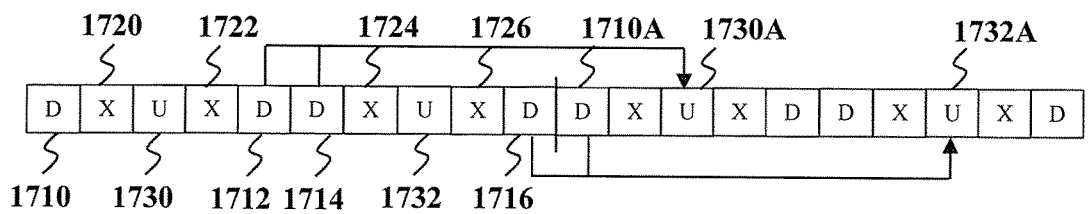
FIG. 17 illustrates HARQ-ACK timing in response to PDSCH receptions from a HD-FDD UE for a configuration with two UL SFs per frame according to Case 2 according to this disclosure.

FIG. 17 illustrates HARQ-ACK timing in response to PDSCH receptions from a HD-FDD UE for a configuration with two UL SFs per frame according to Case 2 according to this disclosure. The embodiment shown in FIG. 17 is for illustration only. Other embodiments could be used without departing from the scope of the present disclosure.

SF #0 1710, SF #4 1712, SF #5 1714 and SF #9 1716 are DL SFs. SF #1 1720, SF #3 1722, SF #6 1724 and SF #8 1726 are DL-UL or UL-DL switching SFs. SF #2 1730 and SF #7 1732 are UL SFs. A HD-FDD UE reports HARQ-ACK for PDSCH reception in SF #9 1716 and SF #0 1710A in SF #7 1732A and reports HARQ-ACK for PDSCH reception in SF #4 1712 and SF #5 1714 in SF #2 1730A of a next frame. Regardless of a number of PDSCH receptions, the HD-FDD UE always reports two HARQ-ACK information bits in an UL SF; one HARQ-ACK bit for each respective DL SF.

Figure 18:
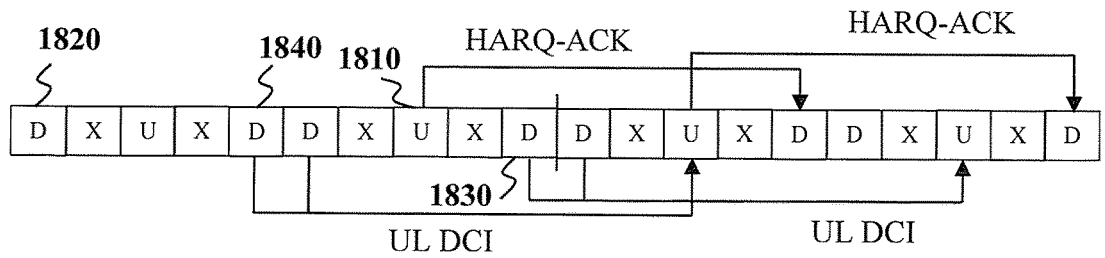
FIG. 18 illustrates a HARQ RTT for PUSCH transmissions from a HD-FDD UE for a configuration with two UL SFs per frame according to Case 2 according to this disclosure.

FIG. 18 illustrates a HARQ RTT for PUSCH transmissions from a HD-FDD UE for a configuration with two UL SFs per frame according to Case 2 according to this disclosure. The embodiment shown in FIG. 18 is for illustration only. Other embodiments could be used without departing from the scope of the present disclosure.

A conventional HARQ RTT, where a UE detects an UL DCI format in SF n, transmits a respective PUSCH in SF n+4, and UE receives HARQ-ACK information for a same HARQ process in SF n+8, cannot be maintained. For UL SF #7 1810, a DL SF occurring at least 4 SFs earlier than UL SF #7 occurs 7 SFs earlier (SF #0) 1820 or 8 SFs earlier (SF #9) 1830, while a DL SF occurring at least 4 SFs later than UL SF #7 occurs 7 SFs later (SF #4) 1840.

Case 3: Equal Number of DL SFs and UL SFs

A number of UL SFs configured to a HD-FDD UE per frame can increase by progressively decreasing a number of DL SFs while maintaining some SFs, such as SF #0 and SF #5, as DL SFs. Considering the existence of DL-UL and UL-DL switching SFs, an equal number of DL SFs and UL SFs is three. In addition to SF #0 and SF #5, the third DL SF can be SF #4 or SF #9. When SF #4 is a DL SF, the UL SFs are SF #2, SF #7 and SF #8 and remaining SFs are either DL-UL or UL-DL switching SFs. When SF #9 is a DL SF, the UL SFs are SF #2, SF #3 and SF #7 and remaining SFs are either DL-UL or UL-DL switching SFs.

Figure 19:
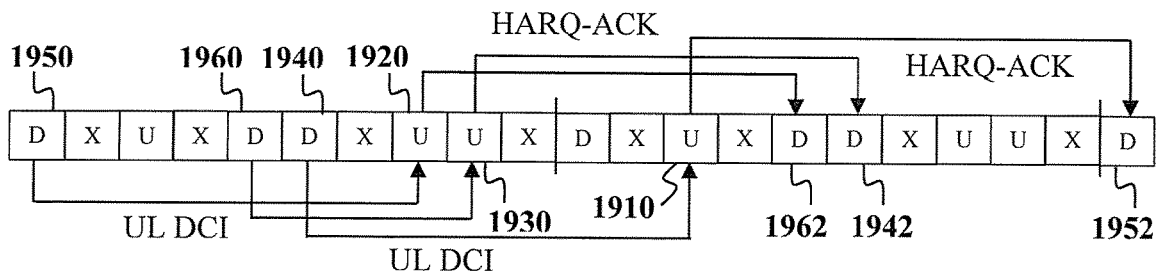
FIG. 19 illustrates a HARQ RTT for PUSCH transmissions from a HD-FDD UE for a configuration with three DL SFs and three UL SFs per frame where SF #4 is a DL SF according to this disclosure.

FIG. 19 illustrates a HARQ RTT for PUSCH transmissions from a HD-FDD UE for a configuration with three DL SFs and three UL SFs per frame where SF #4 is a DL SF according to this disclosure. The embodiment shown in FIG. 19 is for illustration only. Other embodiments could be used without departing from the scope of the present disclosure.

An eNB can schedule a PUSCH transmission from a HD-FDD UE in UL SF #2 1910, UL SF #7 1920, or UL SF #8 1930 by transmitting an UL DCI format in DL SF #5 1940, DL SF #0 1950, or DL SF #4 1960, respectively. A one-to-one association applies between the 3 UL SFs and the 3 DL SFs with respect to an UL SF for a PUSCH transmission and a DL SF for a respective UL DCI format transmission. The eNB transmits HARQ-ACK information to the HD-FDD UE in DL SF #0 1952, DL SF #4 1962, or DL SF #5 1942 in response to a respective PUSCH reception in UL SF #2 1910, UL SF #7 1920, or UL SF #8 1930. The HARQ RTT is not maintained at 8 SFs.

Figure 20:
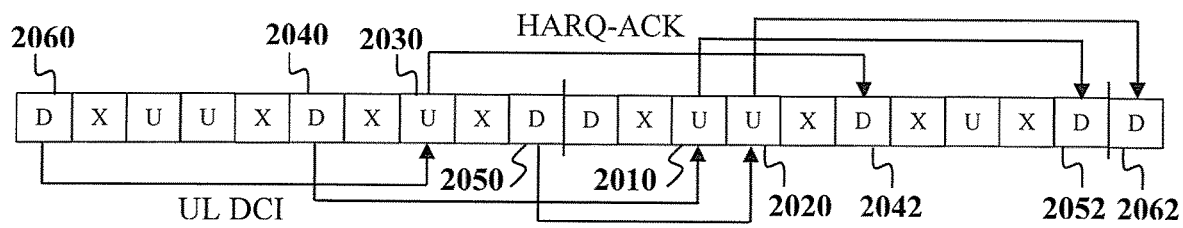
FIG. 20 illustrates a HARQ RTT for PUSCH transmissions from a HD-FDD UE for a configuration with three DL SFs and three UL SFs per frame where SF #9 is a DL SF according to this disclosure.

FIG. 20 illustrates a HARQ RTT for PUSCH transmissions from a HD-FDD UE for a configuration with three DL SFs and three UL SFs per frame where SF #9 is a DL SF according to this disclosure. The embodiment shown in FIG. 20 is for illustration only. Other embodiments could be used without departing from the scope of the present disclosure.

An eNB can schedule a PUSCH transmission from a HD-FDD UE in UL #2 2010, UL SF #3 2020, or UL SF #7 2030 by transmitting an UL DCI format in DL SF #5 2040, DL SF #9 2050, or DL SF #0 2060, respectively. A one-to-one association applies among the 3 UL SFs and the 3 DL SFs with respect to an UL SF for a PUSCH transmission and a DL SF for a respective UL DCI format transmission. The eNB 102 transmits HARQ-ACK information to the HD-FDD UE in DL SF #9 2052, DL SF #0 2062, or DL SF #5 2042 in response to a respective PUSCH reception in UL SF #2 2010, UL SF #3 2020, or UL SF #7 2030. The HARQ RTT is not maintained at 8 SFs.

Case 4: Reducing Number of Switching SFs

The existence of switching SFs reduces an UL data rate or a DL data rate for a HD-FDD UE as PUSCH transmissions of PDSCH receptions cannot be supported in switching SFs. To increase a DL data rate or an UL data rate for a HD-FDD UE, it is beneficial to reduce the number of (DL-UL or UL-DL) switching SFs. Configurations of DL SFs and UL SFs over multiple frames can be defined in order to reduce a number of switching SFs, achieve a desired split of DL SFs and UL SFs, while ensuring that a HD-FDD UE can receive system information such as SIB and paging.

Figure 21:
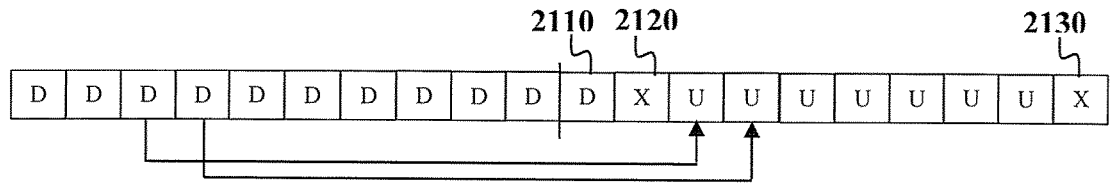
FIG. 21 illustrates a first configuration of DL SFs and UL SFs for a HD-FDD UE over a pair of odd and even frames according to this disclosure.

FIG. 21 illustrates a first configuration of DL SFs and UL SFs for a HD-FDD UE over a pair of odd and even frames according to this disclosure. The embodiment shown in FIG. 21 is for illustration only. Other embodiments could be used without departing from the scope of the present disclosure.

In an odd frame, all SFs are DL SFs. In an even frame, only SF #0 2110 is DL SF, SF #1 2120 is a DL-UL switching SF, SF #9 2130 is a UL-DL switching SF and all other SFs are UL SFs. PUSCH scheduling in an UL SF in an even frame can be from a DL SF with a same SF number in an odd frame or, in general, from any DL SF that occurs at least 4 SFs prior to the UL SF. Compared to a configuration with an equal number of three DL SFs or UL SFs per frame, the DL data rate can increase by about 83% as the number of DL SFs over a pair of frames increases from 6 to 11, while the UL data rate can increase by about 17% as the number of UL SFs over a pair of frames increases from 6 to 7.

Figure 22:
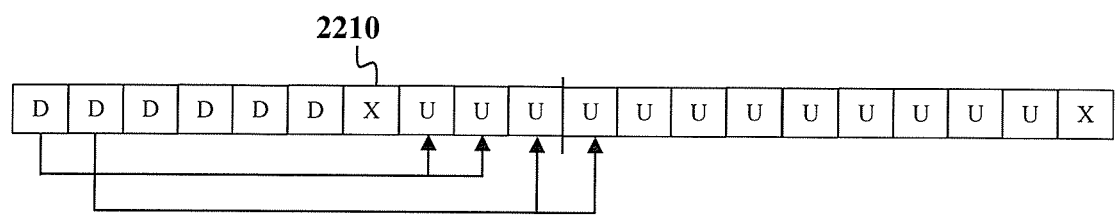
FIG. 22 illustrates a second configuration of DL SFs and UL SFs for a HD-FDD UE over a pair of odd and even frames according to this disclosure.

FIG. 22 illustrates a second configuration of DL SFs and UL SFs for a HD-FDD UE over a pair of odd and even frames according to this disclosure. The embodiment shown in FIG. 22 is for illustration only. Other embodiments could be used without departing from the scope of the present disclosure.

A first (DL-to-UL) switching SF 2210 is shifted relative to its position in FIG. 21. This allows an eNB to trade-off a decrease in a DL data rate with an increase in an UL data rate for a HD-FDD UE. As there are more UL SFs than DL SFs per pair of frames, an UL DCI format needs to include an UL index in order to potentially schedule a HD-FDD UE in all UL SFs. Then, it is required that PUSCH in multiple UL SFs can be scheduled from a single DL SF. Alternatively, a SF duration can be modified to include multiple SFs and a single UL DCI format can schedule a PUSCH transmission over the multiple SFs or, equivalently, over a SF of longer duration. Compared to a configuration with an equal number of three DL SFs or UL SFs per frame, the DL data rate remains unchanged as the number of DL SFs over a pair of frames remains the same, while the UL data rate can increase by about 100% as a number of UL SFs over two frames increases from 6 to 12. Even though an HD-FDD UE is not able to receive PBCH or PSS/SSS in SF #0 of the second frame in the pair of frames, this is not problematic as the HD-FDD UE has an established RRC connection. Moreover, an HD-FDD UE can disregard a configuration of SFs when the HD-FDD UE receives paging message indicating a change in system information.

For a configuration with more DL SFs than UL SFs for a HD-FDD UE, such as the one in FIG. 21, a one-to-one association can exist between a DL SF conveying an UL DCI format and an UL SF where the HD-FDD UE transmits a respective PUSCH. Transmission of explicit or implicit HARQ-ACK information in a DL SF in response to a PUSCH transmission in an UL SF can have a same SF association as the one for UL DCI format transmission in a DL SF and respective PUSCH transmission in an UL SF. Then, the HARQ RTT is 2 frames (and it is larger than a HARQ RTT of 8 SFs for a FD-FDD UE).

For a configuration with more UL SFs than DL SFs for a HD-FDD UE, such as the one in FIG. 22, it is required that PUSCH transmissions from the HD-FDD UE in more than one UL SFs can be scheduled from a single DL SF. An UL index IE is then required in an UL DCI format as described for "Case 1". Alternatively, a longer SF duration of M SFs can be defined and an UL DCI format can schedule a transmission of a data TB in a PUSCH over M SFs. For the example in FIG. 22, an eNB can transmit an UL DCI format in a first DL SF (SF #0 in the first frame) that schedules PUSCH transmissions from the HD-FDD UE in the first two UL SFs (SF #7 and SF #8 in the first frame), the eNB can transmit an UL DCI format in a second DL SF (SF #1 in the first frame) that schedules PUSCH transmissions from the HD-FDD UE in the second two UL SFs (SF #9 in the first frame and SF #0 in the second frame), and so on. The concept of a longer SF duration corresponding to M SFs can also apply when a configuration has multiple consecutive DL SFs and one DL DCI format can schedule a data TB transmission to a UE over the M SFs. Implicit or explicit HARQ-ACK transmission can have a same association between a DL SF and a pair of UL SFs (M=2), and occur in a frame immediately after the second frame in the pair of frames. Then, HARQ RTT is 2 frames (and it is larger than a HARQ RTT of 8 SFs for a FD-FDD UE). In case of PHICH transmission, a resource determination can be as described for "Case 1".

The above scheduling principles can be directly extended to all other possible configurations of DL SFs and UL SFs that span multiple frames depending on whether a number of DL SFs is larger than a number of UL SFs as described with reference to FIG. 21 and FIG. 22.

In general, when PUSCH transmissions from different HD-FDD UEs are in different UL BWs but respective PHICH transmissions from an eNB are in a same UL BW, the PHICH resource determination can further include an offset that is configured to each UE from the eNB by higher layer signaling such as RRC signaling. This offset can correspond to an index of the first RB as it is determined relative to an index of RBs in an UL system BW (not relative to the UL BW assigned to a HD-FDD UE). Then $$n_{PHICH}^{group}=(I_{PRB\_RA}+\text{offset}+n_{DMRS}) \bmod N_{PHICH}^{group}+N_{PHICH}^{group}$$

$$n_{PHICH}^{seq}=(\lfloor I_{PRB\_RA}+\text{offset})/N_{PHICH}^{group} \rfloor+n_{DMRS}) \bmod 2N_{SF}^{PHICH}$$

When PHICH is not supported for HD-FDD UEs, an UL DCI format can be simplified by removing the CS and OCC IE or the HD-FDD UE can assume that the respective bits are set to zero. This is also because spatial multiplexing of PUSCH transmissions from different HD-FDD UEs over a small number of RBs is not beneficial and using a default DMRS CS and OCC value, such as the first CS and the OCC having all values equal to 1 suffices. This can also improve coverage of UL DCI formats as a respective size is effectively reduced.

Although the present disclosure has been described with example embodiments, various changes and modifications can be suggested to one skilled in the art. It is intended that the present disclosure encompass such changes and modifications that fall within the scope of the appended claims.

What is claimed is:

1. A base station comprising:
a processor configured to:
generate a first random access response (RAR) message that includes a first transmission power control (TPC) command field having a first size;
generate a second RAR message that includes a second TPC command field having a second size, wherein the second size is smaller than the first size; and
a transceiver, operably connected to the processor, the transceiver configured to:
transmit the first RAR message and the second RAR message;
receive a first physical uplink shared channel (PUSCH) scheduled by the first RAR message, wherein:
the first PUSCH is received within a maximum of one time unit, and
a received power for the first PUSCH depends on a value of the first TPC command field; and
receive a second PUSCH scheduled by the second RAR message, wherein:
the second PUSCH is received within a maximum of more than one time units; and
a received power for the second PUSCH depends on a value of the second TPC command field.

2. The base station of claim 1, wherein:
the first RAR message includes a frequency hopping (FH) flag field of one binary element, and
the second RAR message does not include the FH flag field.

3. The base station of claim 1, wherein:
the first RAR message includes an UL delay field of one binary element, and
the second RAR message does not include the UL delay field.

4. The base station of claim 1, wherein:
the first RAR message includes a temporary cell radio network temporary identifier (TC-RNTI) field of sixteen binary elements, and
the second RAR message does not include the TC-RNTI field.

5. A base station comprising:
an encoder configured to encode a first downlink control information (DCI) format that includes a redundancy version (RV) field of a first size and a second DCI format that includes a RV field of a second size, wherein the second size is smaller than the first size; and
a transceiver, operably connected to the encoder, the transceiver configured to:
transmit the first DCI format; and
transmit the second DCI format,
wherein:
the first DCI format schedules a transmission of a first physical uplink shared channel (PUSCH) within a maximum of one time unit, and
the second DCI format schedules a transmission of a second PUSCH within a maximum of more than one time units.

6. The base station of claim 5, wherein:
the first DCI format includes a hybrid automatic repeat request (HARQ) process number field of a third size, and
the second DCI format includes a HARQ process number field of a fourth size, wherein the fourth size is smaller than the third size.

7. A user equipment (UE) comprising:
a receiver configured to:
receive information configuring reception of:
a first downlink control information (DCI) format having a redundancy version (RV) field of a first size, or
a second DCI format having a RV field of a second size, and
receive the first DCI format or the second DCI format, wherein:
the first DCI format schedules a reception of a first physical uplink shared channel (PUSCH) within a maximum of one time unit, and
the second DCI format schedules a reception of a second PUSCH within a maximum of more than one time units, and
the second size is smaller than the first size; and
a decoder configured to decode the first DCI format or the second DCI format.

8. The UE of claim 7, wherein:
the first DCI format includes a hybrid automatic repeat request (HARQ) process number field of a third size, and
the second DCI format includes a HARQ process number field of a fourth size, wherein the fourth size is smaller than the third size.

9. A method comprising:
generating a first random access response (RAR) message that includes a first transmission power control (TPC) command field of a first size;
generating a second RAR message that includes a second TPC command field of a second size wherein the second size is smaller than the first size;
transmitting the first RAR message and the second RAR message;
receiving a first physical uplink shared channel (PUSCH) scheduled by the first RAR message, wherein:
the first PUSCH is received within a maximum of one time unit, and
a received power for the first PUSCH depends on a value of the first TPC command field; and
receiving a second PUSCH scheduled by the second RAR message, wherein:
the second PUSCH is received within a maximum of more than one time units, and a received power for the second PUSCH depends on a value of the second TPC command field.

10. The method of claim 9, wherein:
the first RAR message includes an UL delay field of one binary element, and
the second RAR message does not include the UL delay field.

11. The method of claim 9, wherein:
the first RAR message includes a temporary cell radio network temporary identifier (TC-RNTI) field of sixteen binary elements, and
the second RAR message does not include the TC-RNTI field.

12. A method comprising:
encoding a first downlink control information (DCI) format that includes a redundancy version (RV) field of a first size and a second DCI format that includes a RV field of a second size, wherein the second size is smaller than the first size;
transmitting the first DCI format; and
transmitting the second DCI format,
wherein:
the first DCI format schedules a transmission of a first physical uplink shared channel (PUSCH) within a maximum of one time unit, and
the second DCI format schedules a transmission of a second PUSCH within a maximum of more than one time units.

13. The method of claim 12, wherein:
the first DCI format includes a hybrid automatic repeat request (HARQ) process number field of a third size, and
the second DCI format includes a HARQ process number field of a fourth size, wherein the fourth size is smaller than the third size.

* * * * *